US009315973B2

(12) United States Patent
Varman et al.

(10) Patent No.: US 9,315,973 B2
(45) Date of Patent: Apr. 19, 2016

(54) FIRE HYDRANT COVER INCLUDING A CONTROLLER COUPLED WITH A TRANSCEIVER AND A LOCK MECHANISM

(75) Inventors: Raziel Varman, Modiin (IL); Isaac Amit, Kfar Saba (IL); Gavriel Simcha Dotan, Netanya (IL); Rafael Rauscher, Kfar Yona (IL); Uri Sabag, Holon (IL); Jacob Graudenz, Bnei Brak (IL); Yarum Locker, Givat Shmuel (IL)

(73) Assignee: Miltel Communication Ltd., Givat Shmuel (IE)

( * ) Notice: Subject to any disclaimer, the term of this patent is extended or adjusted under 35 U.S.C. 154(b) by 120 days.

(21) Appl. No.: 14/343,933
(22) PCT Filed: Sep. 12, 2012
(86) PCT No.: PCT/IL2012/000340
§ 371 (c)(1),
(2), (4) Date: Jun. 18, 2014
(87) PCT Pub. No.: WO2013/038404
PCT Pub. Date: Mar. 21, 2013

(65) Prior Publication Data
US 2014/0373941 A1 Dec. 25, 2014

Related U.S. Application Data

(60) Provisional application No. 61/533,507, filed on Sep. 12, 2011, provisional application No. 61/699,325, filed on Sep. 11, 2012.

(51) Int. Cl.
*E03B 9/06* (2006.01)
*F16K 35/10* (2006.01)
*F16K 27/12* (2006.01)

(52) U.S. Cl.
CPC . *E03B 9/06* (2013.01); *F16K 27/12* (2013.01); *F16K 35/10* (2013.01); *Y10T 137/5468* (2015.04)

(58) Field of Classification Search
CPC .......... E03B 9/06; F16K 35/10; F16K 27/12; Y10T 137/5468

USPC ................ 137/296, 382, 327, 294, 377, 385; 70/175
See application file for complete search history.

(56) References Cited

U.S. PATENT DOCUMENTS 5,596,893 A 1/1997 Stehling et al.
5,722,450 A 3/1998 Julicher
(Continued)

OTHER PUBLICATIONS

International Search Report and Written Opinion issued on Feb. 19, 2013 in connection with PCT/IL2012/000340. 8 pages.

*Primary Examiner* — Kevin Lee
(74) *Attorney, Agent, or Firm* — Vedder Price P.C.

(57) ABSTRACT

A protective-fire-hydrant-cover comprising an operating-nut-extender and a protective-fire-hydrant-casing. The operating-nut-extender is firmly coupled with an operating-nut of a fire-hydrant such that when the operating-nut-extender rotates, the operating-nut rotates therewith, the operating-nut-extender includes an inner-groove exhibiting a substantially circular shape. The protective-fire-hydrant casing includes a lock-mechanism therein, which includes a latch. The latch moves between at least a locked and un-operable position and an unlocked position. The protective-fire-hydrant-casing fits over the operating-nut-extender such that it covers the operating-nut-extender and the latch aligns with the groove. When the latch moves to locked and un-operable position the latch enters the inner-groove thus internally locking the protective fire-hydrant-casing with the operating-nut-extender thus locking the protective fire-hydrant-cover onto the fire-hydrant. When the latch is in locked and un-operable position, the protective-fire-hydrant-casing may freely rotate about the operating-nut-extender. When the latch moves to the unlocked position, the protective-fire-hydrant-casing unlocks from the operating-nut-extender.

21 Claims, 11 Drawing Sheets

(56) References Cited

U.S. PATENT DOCUMENTS

| | | |
|---|---|---|
| 6,802,338 B1 | 10/2004 | Istre, Jr. |
| 6,994,106 B1 * | 2/2006 | Hackley et al. ........... E03B 9/06 137/385 |
| 7,040,342 B1 * | 5/2006 | Stehling et al. ........... E03B 9/02 137/382 |
| 8,353,309 B1 * | 1/2013 | Embry et al. .......... A62C 35/20 137/385 |

* cited by examiner

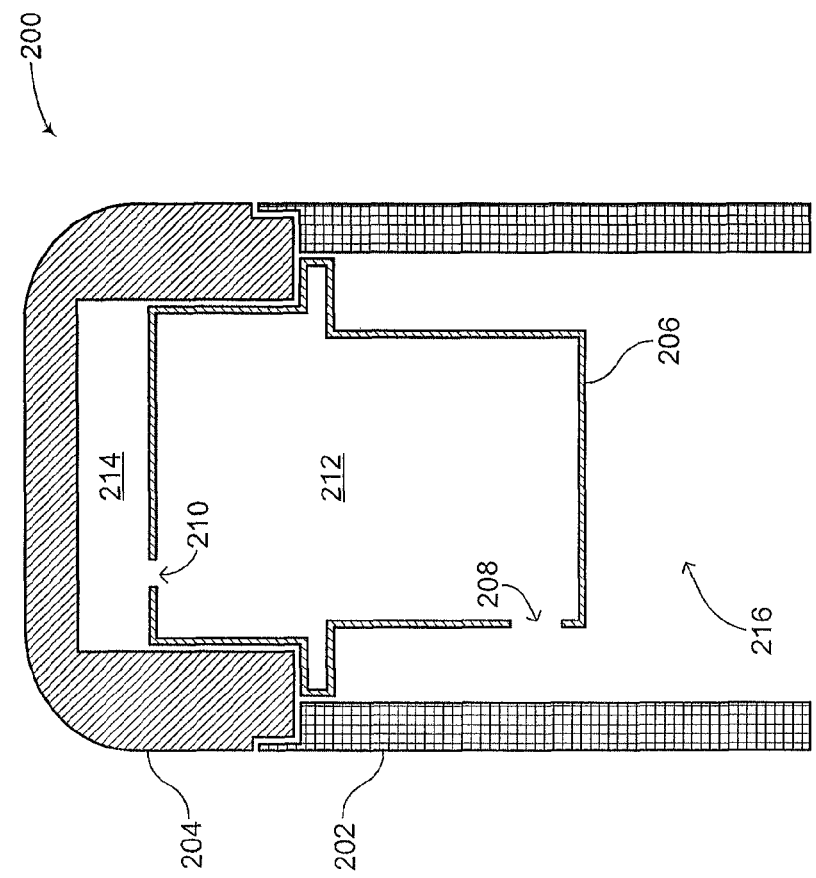
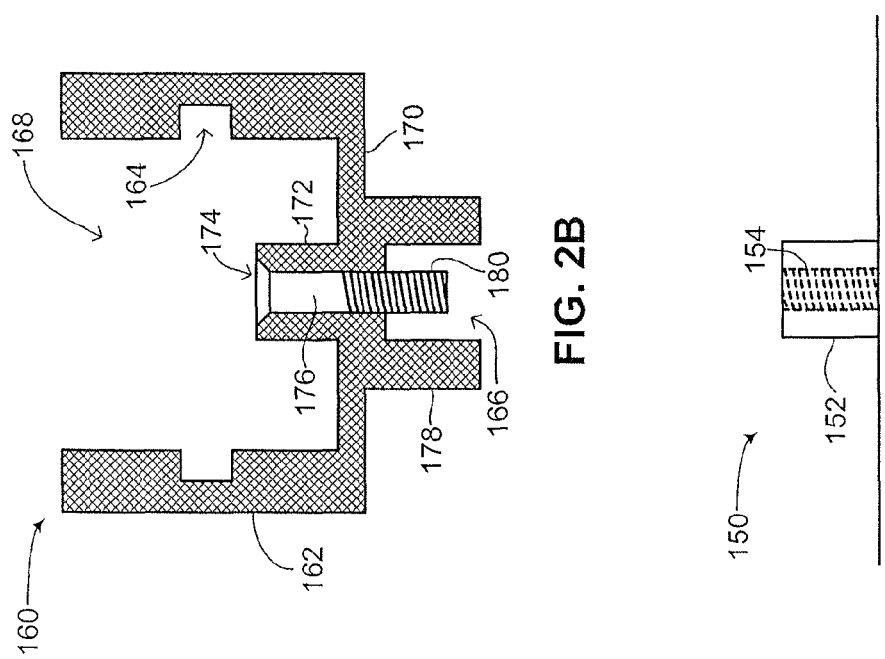

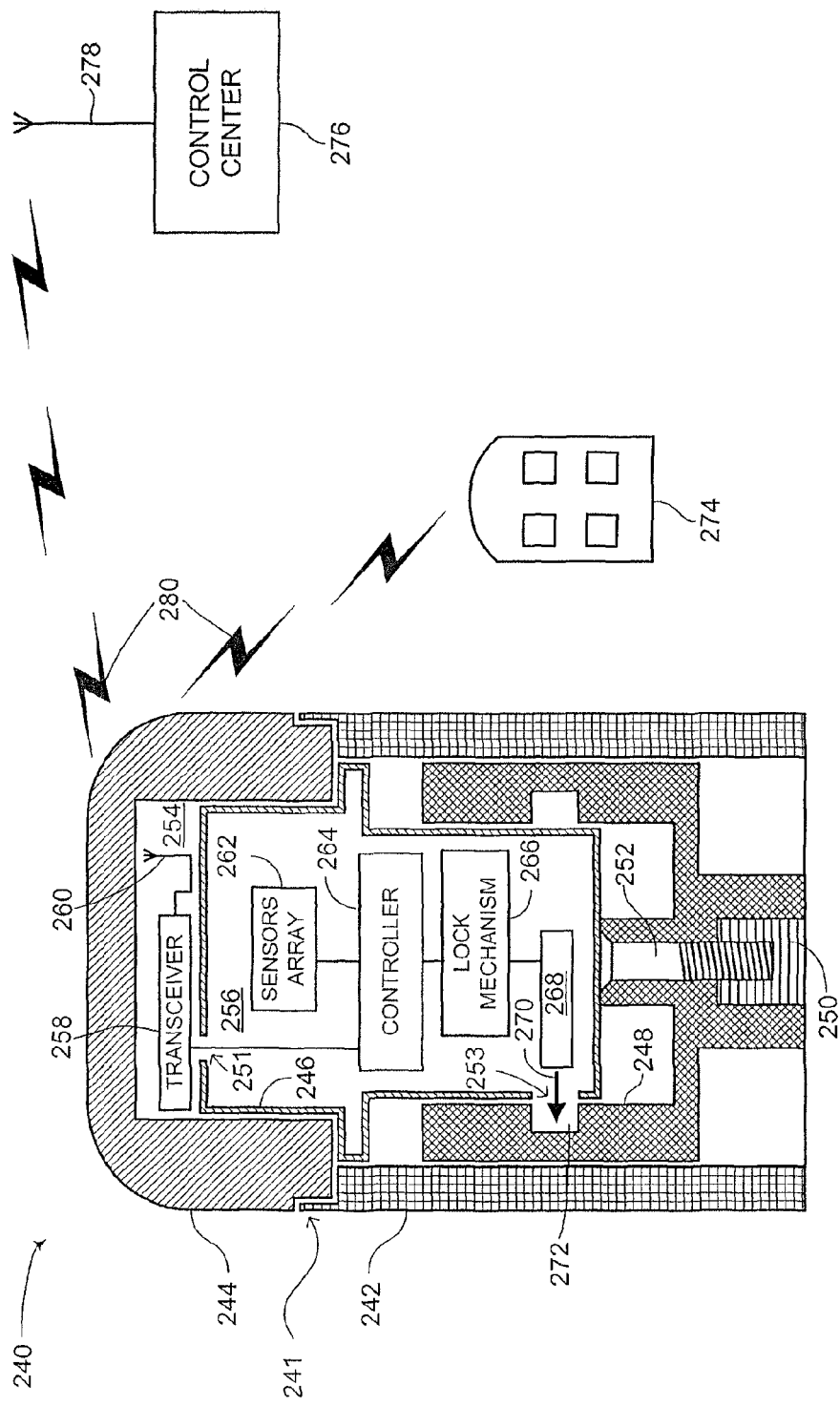

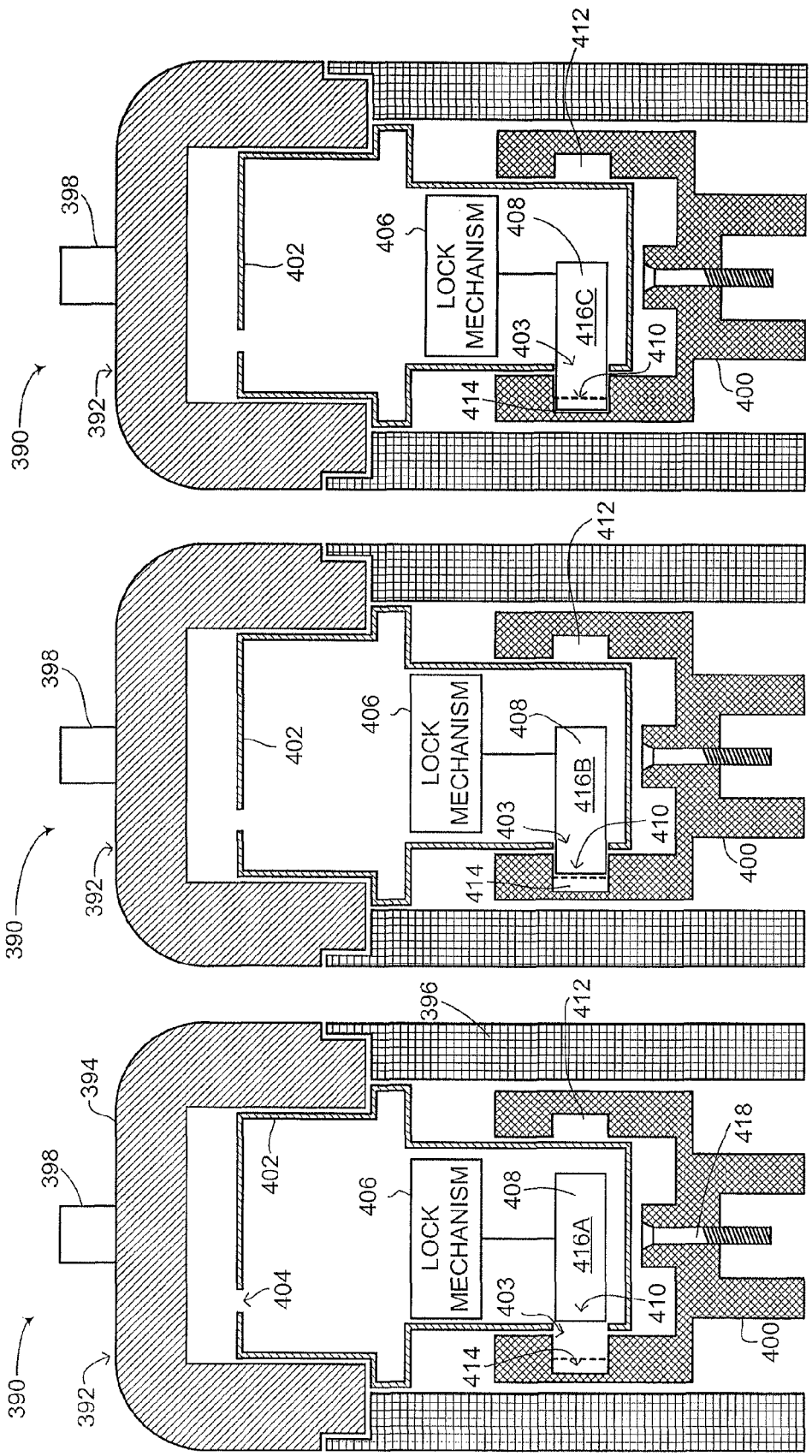

FIRE HYDRANT COVER INCLUDING A CONTROLLER COUPLED WITH A TRANSCEIVER AND A LOCK MECHANISM

FIELD OF THE DISCLOSED TECHNIQUE

The disclosed technique relates to fire hydrants, in general, and to methods and systems for controlling the use of fire hydrants, in particular.

BACKGROUND OF THE DISCLOSED TECHNIQUE

Fire hydrants are an essential part of any modern fire fighting system and are thus very common in urban and suburban areas in many countries around the world. Their high density in numbers and their locations, usually in open public places, raise a number of problems. As fire hydrants provide direct access to a city's water main, fire hydrants can easily be used to steal large amounts of water from a municipal authority or a utility provider. Moreover, due to the fact that tampering with standard fire hydrants may take a long time to detect, a significant loss of water can also be caused by vandalism or mischief. In the course of tampering, the fire hydrant can be damaged, creating situations where fire-fighting personnel are unable to operate the fire hydrant in an emergency situation. Additionally, fire hydrants can be used to contaminate at least a part of a municipal water system by injecting contaminants through the fire hydrant into the city's water main.

Systems for the prevention of tampering with fire hydrants as well as for monitoring fire hydrants are known in the art. U.S. Pat. No. 7,980,317 issued to Preta et al. entitled "Smart monitor for fire hydrants" is directed to a system for monitoring fire hydrants which detects and notifies a utility provider when the fire hydrant is being activated or when it should be serviced. The system comprises a monitor module which includes a module-nut, an alert element and various electronic components. The monitor module is associated with the operating nut of the fire hydrant through an operating nut receiver secured to the operating nut with one or more securing pens. The module-nut protrudes from the top surface of the monitor module and is mechanically associated with the fire hydrant's operating nut so that the module-nut is used for turning the fire hydrant on and off. The alert element is configured to provide a visual signal in three different directions. The electronic components of the monitor module include a processing device, a memory, a camera, an audio module, an RF transceiver, various sensors, a GPS system and an electronic lock. The memory is used for storing image and sound data as well as data from the various sensors. The camera and audio module are configured to record images and sounds when the fire hydrant is activated. The RF transceiver is used for transmitting information to a utility provider including activation data as well as data relating to the maintenance of the fire hydrant. The activation data may include the time of activation or the amount of water consumption, while maintenance-related data may include a notification that the fire hydrant should be serviced. The transceiver is also used to allow remote access to the monitor module such as activating the alert element remotely by the utility provider. The sensors are used for detecting an activation of the fire hydrant and monitoring various parameters relating to the operation of the fire hydrant, such as counting the number of turns of the operating nut, checking the lubricating chamber of the fire hydrant for sufficient lubricant, monitoring the temperature of the fire hydrant or detecting back flow from the fire hydrant. The electronic lock may be a software lock for preventing access to various functions of the monitor module, or a mechanical lock that prevents the fire hydrant's output ports from being opened.

U.S. Patent Application Publication No. 2004/0129312 to Cuzzo et al. entitled "Water system tampering sensing device" is directed to a water system protection device, and in particular to a device for protecting fire hydrants against tampering. The system includes two portions with hasps connected at their ends by a hinge. The system further includes a locking device, an anti-tempering device, sensors, a transmitter, a receiver and an interface access port. The two portions are closed over the upper part of the fire hydrant forming a donut shape preventing access to the fire hydrant's nozzles. The two portions are locked together using the locking device connecting together the hasps. The locking device may be a key or combination lock, a ring, a wire or the like. The anti-tempering device may be a break detection wire embedded in the two portions, such that opening the two portions causes the break detection wire to split, providing an indication that the fire hydrant has been tampered with. Further indication of tampering is given by the sensors such as vibration sensors, tilt switches, pressure switches, and temperature switches. When the break detection wire or the sensors provide an indication of tampering, the transmitter sends an encrypted signal to a central monitoring facility identifying the location of the fire hydrant. The interface access port enables authorized personal to access the fire hydrant by entering a deactivation code. The interface access port may have a wireless interface where the authorized person uses a wireless device in order to gain access. The water system protection device may also allow access to the fire hydrant via the receiver which can receive a temporary deactivation code from the central monitoring facility.

The "KingLock Hydrant Lock," a product of the company www.kinglock.us (and disclosed on the website http://www.pollardwater.com/pagesproduct/kingLock.asp or on the web site http://www.kinglock.us), is directed to a device for preventing access to the operating nut of a fire hydrant and for sounding an alarm when the device is breached. The device includes an operating nut extender, an outer shell comprised of a base part and a hinged cover, a stainless steel locking pin, two hex wrenches that are used as retainer pins and an alarm package. The device may further include a transceiver and sensors. The operating nut extender is secured to the fire hydrant's operating nut. The outer shell is placed over the operating nut extender and secured in its place by the locking pin which is inserted horizontally though a hole in the side wall of the outer shell into a groove in the operating nut extender. This configuration allows the outer shell to rotate freely around the operating nut extender. The locking pin in its turn is locked in its place by the two hex wrenches that are inserted vertically through two holes in the top surface of the base part of the outer shell. The alarm package together with the transceiver and sensors may be installed inside the inner cavity of the hinged cover. The base part and the hinged cover of the outer shell include hasps that allow the hinged cover to be locked in a closed state using a standard lock. Once the device is installed the fire hydrant can be turned on and off through the operating nut extender when the hinged cover is open. When the hinged cover is closed there is no access to the operating nut extender or to the hex wrenches which secure the locking pin. The alarm package includes a keypad for entering an alarm code. Once the hinged cover is opened the alarm package will sound an alarm after a predetermined time unless the alarm code is entered. The transceiver may be used for mesh network communications.

SUMMARY OF THE PRESENT DISCLOSED TECHNIQUE

It is an object of the disclosed technique to provide a novel protective fire hydrant cover. In accordance with the disclosed technique, there is thus provided a protective fire hydrant cover comprising and operating nut extender and a protective fire hydrant casing. The operating nut extender is adapted to be firmly coupled with an operating nut of a fire hydrant such that when the operating nut extender is rotated, the operating nut rotates therewith. The operating nut extender including a inner groove exhibiting a substantially circular shape. The protective fire hydrant casing includes a lock mechanism therein. The lock mechanism includes a latch, the latch being adapted to move between at least a locked and un-operable position and an unlocked position. The protective fire hydrant casing is adapted to be fitted over the operating nut extender such that the protective fire hydrant casing covers the operating nut extender and the latch is aligned with the groove. When the latch moves to the locked and un-operable position, the latch enters the inner groove thus internally locking the protective fire hydrant casing with the operating nut extender and thus locking the protective fire hydrant cover onto the fire hydrant. When the latch is in the locked and un-operable position, the protective fire hydrant casing is free to rotate about the operating nut extender without rotating the operating nut extender. When the latch moves to the unlocked position, the protective fire hydrant casing is unlocked from the operating nut extender.

BRIEF DESCRIPTION OF THE DRAWINGS

The disclosed technique will be understood and appreciated more fully from the following detailed description taken in conjunction with the drawings in which:

FIG. 2A is a cross-sectional schematic illustration of an operating nut of a fire hydrant, constructed and operative in accordance with another embodiment of the disclosed technique;

FIG. 2B is a cross-sectional schematic illustration of an operating nut extender, constructed and operative in accordance with a further embodiment of the disclosed technique;

FIG. 2C is a cross-sectional schematic illustration of a protective fire hydrant cover, constructed and operative in accordance with another embodiment of the disclosed technique;

FIG. 3 is another schematic illustration of a protective fire hydrant cover, constructed and operative in accordance with a further embodiment of the disclosed technique;

FIGS. 5E to 5G are schematic illustrations showing three states of a latch used with the operating nut extender of FIGS. 5A and 5B, constructed and operative in accordance with a further embodiment of the disclosed technique.

DETAILED DESCRIPTION OF PREFERRED EMBODIMENTS

The disclosed technique overcomes the disadvantages of the prior art by providing a novel protective fire hydrant cover which includes a protective fire hydrant casing and operating nut extender. The protective fire hydrant casing of the disclosed technique internally locks the operating nut of a fire hydrant thereby preventing tampering with or misuse of a fire hydrant. The protective fire hydrant casing of the disclosed technique can be locked and unlocked using a remote control, or from a distance via a control center, via a telecommunications network and the like. The protective fire hydrant casing of the disclosed technique can include a plurality of sensors for monitoring selected characteristics of a fire hydrant and the surrounding area adjacent to the fire hydrant. The protective fire hydrant casing of the disclosed technique also enables user authorization management of a fire hydrant.

Figure 1C:
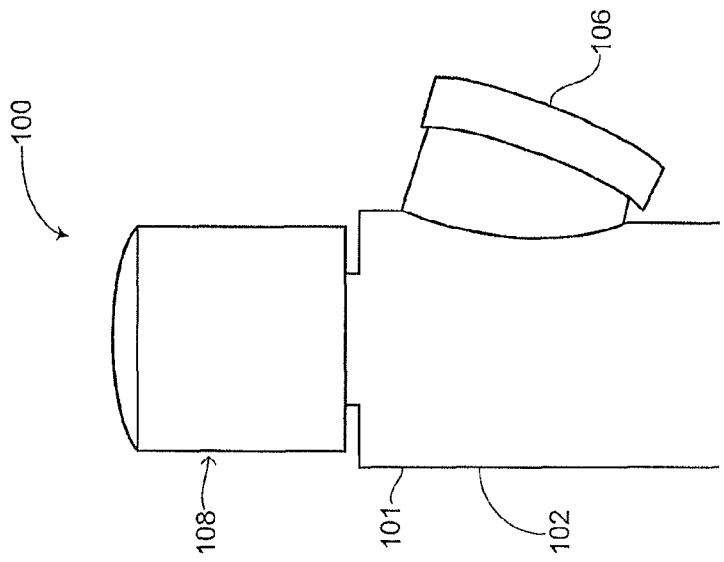
FIGS. 1B-1C are schematic illustrations of a protective fire hydrant cover fitted onto a fire hydrant, in a released and deployed state, respectively, constructed and operative in accordance with an embodiment of the disclosed technique.
Figure 1B:
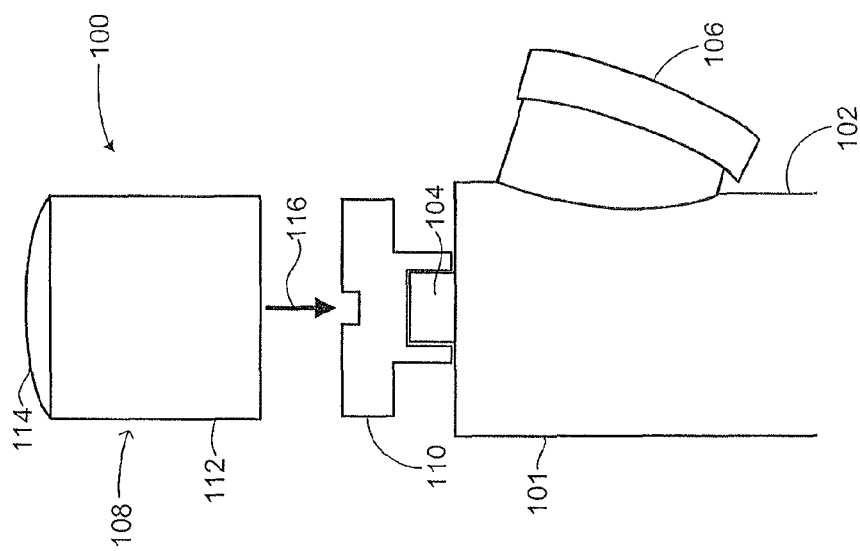
Figure 1A:
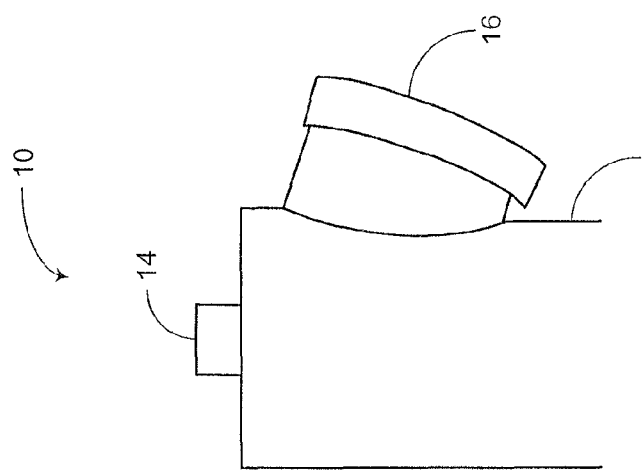
FIG. 1A is a schematic illustration of a prior art fire hydrant.

Reference is now made to FIG. 1A which is a schematic illustration of a prior art fire hydrant, generally referenced 10. Fire hydrant 10 includes a barrel 12, an operating nut 14 and a discharge outlet 16. Fire hydrant 10 also includes a valve (not shown) located inside barrel 12. Discharge outlet 16 is coupled with barrel 12. Operating nut 14 is coupled with the valve. Barrel 12 substantially represents the body of fire hydrant 10 and is usually coupled with a water supply (not shown) located underground (not shown). Water released from fire hydrant 10 flows out of discharge outlet 16. Operating nut 14 controls the valve which releases the water. Operating nut 14 usually has a polygonal shape, such as a square or pentagon, and is usually opened using a specialized key or wrench designed to match the polygonal shape of operating nut 14.

Reference is now made to FIGS. 1B-1C which are schematic illustrations of a protective fire hydrant cover fitted onto a fire hydrant, in a released and deployed state, respectively, generally referenced 100, constructed and operative in accordance with an embodiment of the disclosed technique. FIG. 1B shows a fire hydrant 101 fitted with the protective fire hydrant cover 100 of the disclosed technique in a released state. FIG. 1C shows fire hydrant 101 fitted with the protective fire hydrant cover 100 of the disclosed technique in a deployed state. Equivalent elements in FIGS. 1B and 1C are labeled using equivalent numbers. Protective fire hydrant cover 100 includes a protective fire hydrant casing 108 and an operating nut extender 110.

With reference to FIG. 1B, fire hydrant 101 includes a barrel 102, operating nut 104 and a discharge outlet 106. Fire hydrant 101 and its elements are substantially similar to fire hydrant 10 (FIG. 1A) and its elements. Fitted onto operating nut 104 is an operating nut extender 110, further described below in FIG. 2B. Operating nut extender 110 is substantially made from a solid piece of metal, such as aluminum, brass, iron, cast steel and the like, and substantially fits over operating nut 104. Operating nut extender 110 has a substantially cylindrical shape. Operating nut extender 110 can be coupled with operating nut 104 using a screw (not shown). In one embodiment, as shown below in FIGS. 2A and 2B, a screw inserted into the top of operating nut 104 is used to couple operating nut extender 110 to operating nut 104. In another embodiment, as shown below in FIGS. 6A and 6B, a screw, or a plurality of screws, inserted from the side of operating nut extender 110 can be used to couple operating nut extender 110 with operating nut 104. It is noted that operating nut extender 110 and operating nut 104 substantially couple as male and female connectors in that operating nut extender 110 is designed to be mated with operating nut 104. Alternatively, operating nut extender 110 can be glued or welded to operating nut 104. In addition, operating nut extender 110 can be fused to operating nut 104 using a screw. Operating nut extender 110 substantially extends in length the connection of operating nut 104 to the valve (not shown) in fire hydrant 101 which controls the flow of water from fire hydrant 101. In this respect, operating nut 104 can be opened and closed by rotating operating nut extender 110.

FIG. 1B also shows protective fire hydrant (herein abbreviated FH) casing 108, described in greater detail below in FIGS. 2C and 3. Protective FH casing 108 includes a body 112 and a cap 114. Body 112 and cap 114 are coupled together. Body 112 and cap 114 may be coupled together by various methods. Body 112 and cap 114 may be welded together via weld joints. Body 112 and cap 114 may be bolted together via nuts and bolts or via internal screws (not shown). Body 112 and cap 114 may be glued together via an adhesive, welded together or fused together by pressure. As described below, in another embodiment of the disclosed technique, protective FH casing 108 can also be embodied as a single element (i.e., not with a separate body and cap as shown in FIG. 1B). Protective FH casing 108 has a substantially cylindrical shape and is wide enough to cover operating nut extender 110, as shown by an arrow 116. As described below in FIGS. 2C and 3, protective FH casing 108 can lock onto operating nut extender 110, while freely rotating about operating nut extender 110 without rotating operating nut extender 110. Thus, protective FH casing 108 prevents access to operating nut 104 and the operation thereof.

With reference to FIG. 1C, protective FH cover 100 is shown with protective FH casing 108 in a deployed state, fully covering the operating nut extender (not shown) and hence the operating nut (not shown) of fire hydrant 101. When protective FH casing 108 is in its deployed state, fire hydrant 101 cannot be used. When protective FH casing 108 is in its released state, as shown in FIG. 1B, then fire hydrant 101 can be used as access to operating nut 104 is possible via operating nut extender 110.

Reference is now made to FIG. 2A is a cross-sectional schematic illustration of an operating nut of a fire hydrant, generally referenced 150, constructed and operative in accordance with another embodiment of the disclosed technique. As shown in FIG. 2A, operating nut 150 includes an outer surface 152 and an inner threaded surface 154. Inner threaded surface 154 and outer surface 152 are coupled with a valve (not shown) for controlling the flow of water from a fire hydrant (not shown). In general, inner threaded surface 154 is hollow such that a screw (not shown) may be inserted. Alternatively (not shown), operating nut 150 may have at least one inner threaded surface on its side such that a side screw may be used to couple an operating nut extender (not shown) to operating nut 150. As a further alternative, the side screw may be used to couple the operating nut extender to operating nut 150 by fastening the screw to the surface of operating nut 150. Turning outer surface 152 substantially controls the valve for controlling the flow of water. In general, authorized users of a fire hydrant, such as firefighters, may be provided with a specialized wrench or key (both not shown), such as a hydrant wrench, a tricoise wrench or a Storz tool which includes a head (not shown) designed to fit around outer surface 152 for simple control of the valve.

Reference is now made to FIG. 2B which is a cross-sectional schematic illustration of an operating nut extender, generally referenced 160, constructed and operative in accordance with a further embodiment of the disclosed technique. Operating nut extender 160 has a generally cylindrical shape which is hollow and is constructed from a solid piece of metal, such as aluminum, iron, brass, cast steel and the like. Operating nut extender 160 includes an upper cylindrical section 162, which forms a hollow 168, and a lower cylindrical section 178, which forms a hollow 166. Upper cylindrical section 162 has a substantially larger diameter than lower cylindrical section 178. Upper cylindrical section 162 and lower cylindrical section 178 share a common base section 170. Upper cylindrical section 162 includes a groove 164. Extending from base section 170, upper cylindrical section 162 also includes a central cylindrical section 172. Central cylindrical section 172 includes a hollow 174 which extends through base section 170 and emerges into lower cylindrical section 178.

Whereas the outer side (not labeled) of lower cylindrical section 178 may be substantially cylindrical, the inner side (not labeled) of lower cylindrical section 178 where hollow 166 is located may be polygonal in shape. In general, the shape of the inner side of lower cylindrical section 178 is designed to match the shape of operating nut 150 (FIG. 2A) and hollow 166 is deep enough such that when lower cylindrical section 178 is placed over operating nut 150, lower cylindrical section 178 substantially completely covers operating nut 150. Hollow 174 is large enough to fit a screw 176. It is noted that in another embodiment (not shown), lower cylindrical section 178 may include a plurality of side screw holes for coupling lower cylindrical section 178 with operating nut 150 (FIG. 2A). An example of such an embodiment is given below in FIGS. 6A and 6B. The inner side of central cylindrical section 172 may include threads which match inner threaded surface 154 (FIG. 2A). Screw 176 is designed to match inner threaded surface 154. Operating nut extender 160 may be firmly coupled to operating nut 150 via a lower side 180 of screw 176. When operating nut extender 160 is coupled with operating nut 150 (as shown in FIG. 3), turning operating nut extender 160 substantially turns operating nut 150 as lower cylindrical section 178 substantially represents a female connector to match outer surface 152 (FIG. 2), which represents a male connector. Thus, operating nut 150 can be controlled by rotating operating nut extender 160. It is noted that instead of fitting operating nut 150 with operating nut extender 160, operating nut 150 of the fire hydrant may be replaced with a designated operating nut exhibiting the cross section of operating nut extender 160.

Reference is now made to FIG. 2C which is a cross-sectional schematic illustration of a protective fire hydrant casing, generally referenced 200, constructed and operative in accordance with another embodiment of the disclosed technique. Protective FH casing 200 includes a body 202, a cap 204 and an inner housing 206. Body 202, cap 204 and inner housing 206 are all coupled with one another. Body 202, cap 204 and inner housing 206 may be coupled via bolts, glue, weld joints, fused together by pressure and the like. Body 202 is constructed from a metal such as iron or stainless steel. The metal from which body 202 is made from can also be a tempered metal, a cast metal or a galvanized metal. Body 202 may be coated with an ultraviolet (herein abbreviated UV) coated paint. Cap 204 is constructed from a hardened plastic such as tempered plastic or polycarbonate. Cap 204 can also be constructed from any other non-conductive material, such as fiberglass, which enables electromagnetic radiation to pass there through and thus does not shield electromagnetic radiation. Consequently, wireless signals may be transmitted and received through cap 204. This is explained is greater detail below in FIG. 3. Inner housing 206 is constructed from a single piece of metal, such as stainless steel, iron, brass and the like and possibly from aluminum as well. It is noted that in another embodiment of the disclosed technique, body 202 and cap 204 may be embodied as a single element (not shown). As a single element (not shown), such a protective FH casing may be made from a hardened non-metallic material, such as plastic, tempered plastic, polycarbonate, fiberglass and the like.

Body 202, cap 204 and inner housing 206 each have a generally cylindrical shape. Body 202, cap 204 and inner housing 206 can also have a generally polygonal shape. Inner housing 206 is substantially hollow and includes two opening, a first opening 208 and a second opening 214. The uses of first opening 208 and second opening 210 are described below in FIG. 3. Inner housing 206 is positioned inside protective FH casing 200 such that a hollow 214 is formed inside cap 204 between the inner surface (not labeled) of cap 204 and the outer surface (not labeled) of inner housing 206. As mentioned above, inner housing includes a hollow 212. Hollows 214 and 212 substantially form chambers, as described below in FIG. 3. A hollow 216 formed by body 202 is shaped such that operating nut extender 160 (FIG. 2B) can fit inside body 202 and be completely covered and protected by body 202, as shown in FIG. 3.

Reference is now made to FIG. 3 which is another schematic illustration of a protective fire hydrant cover, generally referenced 240, constructed and operative in accordance with a further embodiment of the disclosed technique. Protective FH cover 240 includes a protective FH casing 241 and an operating nut extender 248. FIG. 3 shows operating nut extender 248 of the disclosed technique coupled with an operating nut of a fire hydrant with protective FH casing 241 deployed on the operating nut extender. Protective FH casing 241 includes a body 242, a cap 244 and an inner housing 246. Protective FH casing 241 is deployed on an operating nut extender 248. As shown, operating nut extender 248 is coupled with operating nut 250 of a fire hydrant (not shown). A screw 252 couples operating nut extender 248 to operating nut 250. Operating nut extender 248 includes a groove 272. Groove 272 is substantially circular in shape. Protective FH casing 241, operating nut extender 248 and operating nut 250 are substantially similar to protective FH casing 200 (FIG. 2C), operating nut extender 160 (FIG. 2B) and operating nut 150 (FIG. 2A).

Inner housing 246 includes a first opening 251 and a second opening 253. Inner housing 246 is hollow and forms a first chamber 256. A hollow is formed between the inner surface (not labeled) of cap 244 and the outer surface (not labeled) of inner housing 246 thereby forming a second chamber 254. In addition to what was shown in FIG. 2C, protective FH casing 241 includes a transceiver 258, an antenna 260, a sensors array 262, a controller 264, a lock mechanism 266 and a latch 268. Transceiver 258 is coupled with antenna 260 and controller 264. Sensors array 262 and lock mechanism 266 are both coupled with controller 264. Latch 268 forms a part of lock mechanism 266. Transceiver 258 and antenna 260 are located in second chamber 254. Sensors array 262, controller 264 and lock mechanism 266 are located in first chamber 256. Thus, even if cup 244 is broken, lock mechanism 266 and controller 264 remain encased within first chamber 256. Thus, lock mechanism 266 and controller 264 may not be tampered with. First opening 251 enables wires (not labeled) from transceiver 258 to be inserted into inner housing 246 such that transceiver 258 can be coupled with controller 264. Second opening 253 enables latch 268 to move out of inner housing 246 in the direction of an arrow 270 into groove 272. It is noted that transceiver 258 and controller 264 may be embodied as a single element (not shown) on a single printed circuit board (not shown). This single element may be positioned in either first chamber 256 or second chamber 254. It is noted that the description above in which transceiver 258 and antenna 260 is located in second chamber 254 and controller 264 and lock mechanism 266 are located in a second chamber 256 is brought herein as an example only. Transceiver 258, antenna 260, lock mechanism 266 and controller 264 may all be located within inner housing 246. Alternatively, inner housing 246 may be omitted and transceiver 258, antenna 260, lock mechanism 266 and controller 264 may all be located within the hollow of protective FH casing 241.

In addition, protective FH casing 241 can also include a power source (not shown), a memory (not shown) and a micro switch (not shown). The memory may be embodied as a part of controller 264 or as a separate element. The micro switch is an optional component in protective FH casing 241. The power source may be coupled (not shown) with transceiver 258, sensors array 262, controller 264 and lock mechanism 266, for providing those elements with any needed power to operate. The memory may be coupled (not shown) with at least one of controller 264, sensors array 262 and transceiver 258, for recording and storing information. For example, the memory may store information recorded by sensors array 262 at regular intervals. The memory may also store information about the operations of controller 264, such as when controller 264 was given a signal to lock and/or unlock lock mechanism 266. Any information stored on the memory may be transmitted via transceiver 258 to a control center 276 or to a remote control 274. The micro switch may be coupled (not shown) with controller 264 and may also be coupled with cap 244. In general, the micro switch is positioned inside protective FH casing 241 such that when protective FH casing 241, is placed on the fire hydrant, the micro switch is depressed. When protective FH casing 241, is removed from the fire hydrant, the micro switch is not depressed. In this respect, the micro switch substantially provides a signal indicative of whether protective FH casing 241 is physically placed on the fire hydrant or not. The signal can be provided to controller 264, to lock mechanism 266, or both. If the micro switch provides a signal that protective FH casing 241 is placed on the fire hydrant, then controller 264 provides a signal to lock mechanism 266 to lock latch 268 inside groove 272. If the micro switch provides a signal that protective FH casing 241 is not placed on the fire hydrant, then controller 264 provides a signal to lock mechanism 266 to keep latch 268 in an unlocked position. The power source may be a battery and may be located inside first chamber 256. The memory may also be located inside first chamber 256. The micro switch may be located inside first chamber 256 or inside second chamber 254.

As shown, operating nut extender 248 fits over operating nut 250, and protective FH casing 241 fits over operating nut extender 248. Second opening 253 and thus latch 268 is positioned to align with groove 272. Transceiver 258 can transmit and receive signals via antenna 260. For example, transceiver can transmit and receive signals to and from a remote control 274 or a control center 276, equipped with its own antenna 278, as shown via wireless signals 280. It is noted that remote control 274 may embodied as a wireless transmitter, a radio frequency (herein abbreviated RF) transmitter, an infrared (herein abbreviated IR) transmitter, an acoustic transmitter and the like. It is also noted that remote control 274 may be embodied as a keypad requiring an access code to operate. In this respect, remote control 274 may require a user to enter an access code before a signal is transmitted from remote control 274 to protective FH casing 241 to move latch 268 to an open position. Control center 276 may communicate with protective FH casing 241 via a telecommunications network, a wireless network and the like. It is also noted, as mentioned above, that body 242 and cap 244 may be embodied as a single element (not shown). In such an embodiment, the single element may be made from a hardened non-metallic material, such as tempered plastic, polycarbonate or fiberglass, which enables antenna 260 to be positioned inside the single element and still transmit and receive signals. In another embodiment, the single element may be made a metal, such as iron, brass, stainless steel and the like. In this embodiment, antenna 260 is positioned in a downwards direction (not shown), substantially located along the inner wall of the single element near its opening (not labeled) adjacent to the top of a fire hydrant (not shown). In this respect, even though the single element is made from a metal, antenna 260, which is internal to the single element, can still transmit and receive signals.

Signals received from transceiver 258 are provided to controller 264 which controls sensors array 262 and magnetic latch solenoid 266. Upon an appropriate lock signal, controller 264 provides a signal to magnetic latch solenoid 266 to engage latch 268 in the direction of arrow 270 into groove 272. In such a position (not shown), latch 268 firmly couples inner housing 246 to operating nut extender 248, thus internally locking protective FH casing 241 with operating nut extender 248. Since inner housing 246 is coupled with cap 244 and body 242, operating nut extender 248 cannot be accessed and the fire hydrant (not shown) cannot be opened. Protective FH casing 241 may swivel when latch 268 is in its locked position, since groove 272 has a circular shape, yet protective FH casing 241 cannot be removed when latch 268 is in this position. Upon an appropriate unlock signal, controller 264 provides a signal to lock mechanism 266 to disengage latch 268 from groove 272. In such a position (as shown in FIG. 3), latch 268 is located within inner housing 246. Protective FH casing 241 can then be removed from operating nut extender 248 and operating nut extender can be rotated, thus rotating operating nut 250 and enabling the first hydrant to be used.

In general the lock mechanism may be embodied as an electric motor or as a magnetic latch solenoid, which moves a latch. In FIG. 3, Lock mechanism 266 is embodied as a magnetic latch solenoid, the solenoid's energized positioned is required for an extended period of time. This is usually the case in low duty cycle applications. When power is applied to the solenoid, a latch in the solenoid moves to its energized position. The latch fastens magnetically to this position and remains there, consuming no power, until a negative electrical pulse is applied to allow the latch to unfasten. Thus power, or an electrical signal, only needs to be applied to lock mechanism 266 to lock or unlock latch 268. No power is required to keep latch 268 in its locked or unlocked position. Power may be provided to transceiver 258, sensors array 262, controller 264 and magnetic latch solenoid 266 by a battery (not shown) located inside first chamber 256. As mentioned above, remote control 274 or control center 276 may provide signals to transceiver 258 to lock or unlock latch 268 from groove 272. It is noted that if cap 244 was made of a conductive material, such as metal, then transceiver 258 would not be able to transmit or receive signals as the metal cap would shield the electromagnetic radiation transmitted and received by transceiver 258; hence signals would not be transmitted and received. As such, as mentioned above, cap 244 is made from a non-conductive material, such as plastic, which enables electromagnetic radiation, and thus wireless signals, to pass there through.

Sensors array 262 includes a plurality of sensors for monitoring protective FH cover 240, and a fire hydrant (not shown) with protective FH cover 240 deployed on it as well as the area surrounding the fire hydrant. Sensors array 262 may provide signals to controller 264 which provides them to transceiver 258. Transceiver 258 can then transmit the signals to control center 276 on a scheduled or non-scheduled basis. For example, sensors array 262 may periodically send a signal to transceiver 258 which transmit signals to control center 276 on a scheduled basis, thus enabling control center 276 to constantly monitor protective FH cover 240 as well as the fire hydrant it is attached to.

Sensors array 262 may include a temperature sensor (not shown), for measuring the temperature as protective FH cover 240 as well as the ambient temperature around the fire hydrant (e.g., to determined if the fire hydrant is frozen). A temperature sensor can indicate if a fire is in the vicinity of protective FH cover 240 as well as whether protective FH cover 240 is being tampered with. Sensors array 262 may also include a smoke sensor (not shown), for detecting smoke in the area surrounding the fire hydrant, thus providing an indication of a fire in the vicinity of protective FH cover 240. Sensor array 262 may include optical sensors which detect the presence of flames (e.g., optical sensors which are sensitive to the wavelengths emitted by fire). Sensors array 262 may further include a vibrations sensor (not shown), for determining whether protective FH cover 240 or the fire hydrant it is coupled with is being tampered with, for example by the use of a drill or jackhammer. The vibrations sensor may be embodied as a plurality of accelerometers. Sensors array 262 may also include a sound sensor (not shown) for monitoring any sounds around the fire hydrant thus determining whether protective FH cover 240 or the fire hydrant it is coupled with is being tampered with (for example, as above, by the use of a drill or jackhammer). Sensors array 262 may further include a flow sensor and a backflow sensor (both not shown). A flow sensor can be used to measure how much water was used from a fire hydrant equipped with protective FH cover 240. For example, a flow sensor can be used to monitor how much water is used by authorized users other than firefighters, such as city workers, contractors and municipality gardeners, who may be assigned water usage quotas from municipal supplies of water. The flow sensor may also be used to detect leaks in fire hydrant. A backflow sensor can be used to determine if solids or liquids are introduced into the fire hydrant which protective FH cover 240 is coupled with. For example, individuals, such as terrorists, attempting to poison city water, may introduce hazardous chemicals, in solid or liquid form, into fire hydrants. A backflow sensor can indicate if an attempt is made to introduce such chemicals into a fire hydrant. Sensor array 262 may also include a pressure sensor or sensors which indicate the pressure of the water within the hydrant.

An additional sensor array (not shown) located remotely from the fire hydrant, may be wirelessly coupled with controller 264 via transceiver 258, sensing selected parameters at the surroundings of the fire hydrant. For example, a pressure sensor of the pipe which provides water to the fire hydrant may be located several meters from the hydrant. As another example, in a forest environment, optical, heat or acoustic sensors, located on trees surrounding the fire hydrant, may be employed to detect the presence of fire in the forest. Protective FH cover 240 serves as a hub for surrounding wirelessly connected sensors. Thus, transceiver 258 may operate as a transmission relay between the wirelessly coupled sensors and control center 276. In general, transceiver 358 may be employed as a relay between control center 276 and other sensors located in the vicinity of the fire hydrant which are no necessarily directly related to the fire hydrant. For example, a water meter of pipe of a building located in the vicinity of the fire hydrant or a power meter located on a lamp post in the vicinity of the fire hydrant.

In addition to the information provided by sensors array 262 to control center 276, the transmission of periodic signals by transceiver 258 to control center 276 provides a further indication of whether protective FH cover 240 has been tampered with or not. For example, if cap 244, which is not made from a metal, is damaged (e.g., cracked or broken) and transceiver 258 is damaged such that it cannot transmit signals anymore, the lack of periodic signals transmitted from transceiver 258 to control center 276 may indicate to control center 276 that either the power source inside protective FH casing 241 has completely discharged (in the case of a battery) or that cap 244 and consequently transceiver 258 have been damaged or tampered with. It is noted that due to the design of inner housing 246 and its coupling to body 242 and the placement of latch 268, i.e. the locking mechanism of the disclosed technique, inside inner housing 246, even if cap 244 is broken, access to magnetic latch solenoid 266 and latch 268 is still prevented.

According to the disclosed technique, the protective FH cover of the disclosed technique can be used to enable user authorization management of fire hydrants and hence of municipal supplies of water. Each Remote Control is associated with a unique identification. Each fire hydrant may be associated with one or more remote controls (i.e., either at the controller or the control center) and only these remote controls can operate that protective fire hydrant cover. At any time, remote controls may be added or deleted either temporarily or permanently (i.e., either at the controller of the protective fire hydrant cover or at the control center). For example, when a national control center is employed local municipalities may be assigned remote controls which are associated only protective FH covers placed on the fire hydrants in their municipalities. In addition, as mentioned above, remote controls may be associated with respective fire hydrants to enable access to city water for a limited amount of time or for a limited amount of water. For example, a contractor given permission to use city water may be provided with a remote control which will open a protective FH cover of the disclosed technique for a limited time period, such as from January to March of the same year, or for a limited amount of water, such as 1000 liters of water, after which the control center may transmit a signal to the transceiver of the protective FH cover to move the lock mechanism to the locked position after the protective FH casing is placed back on the fire hydrant. Firefighters may be given a master remote control associated with a master code, which is associated with all or a portion fire hydrant equipped with the protective FH cover of the disclosed technique. Should the firefighters loose this master remote control, or should that master remote control be stolen, the master code associated with this master remote control could be deactivated at control center (e.g., by deleting the remote control identification from the list of authorized remote control identifications). In general, as mentioned above, there may be more than one remote control (i.e., which is not a master remote control) associated with each hydrant and each of these remote controls shall not be able to open other hydrants. Furthermore, a single remote control (i.e., which is not a master remote control) may be associated with a selected number of hydrants (e.g., one remote control is associated only with fire hydrants located at a certain street). Nevertheless, these remote controls shall not interfere with the master remote control.

It is noted that remote control 274 may include a transceiver (not shown) as well as a memory or storage element (both not shown). The transceiver can be used for receiving signals or information from protective FH cover 240, such as information provided from sensors array 262. The received information can be stored in the memory. In addition, the transceiver can transmit the stored information to a computer or to control center 276. The stored information can also be downloaded from remote control 274 via appropriate cables (not shown) or wirelessly.

Figure 4:
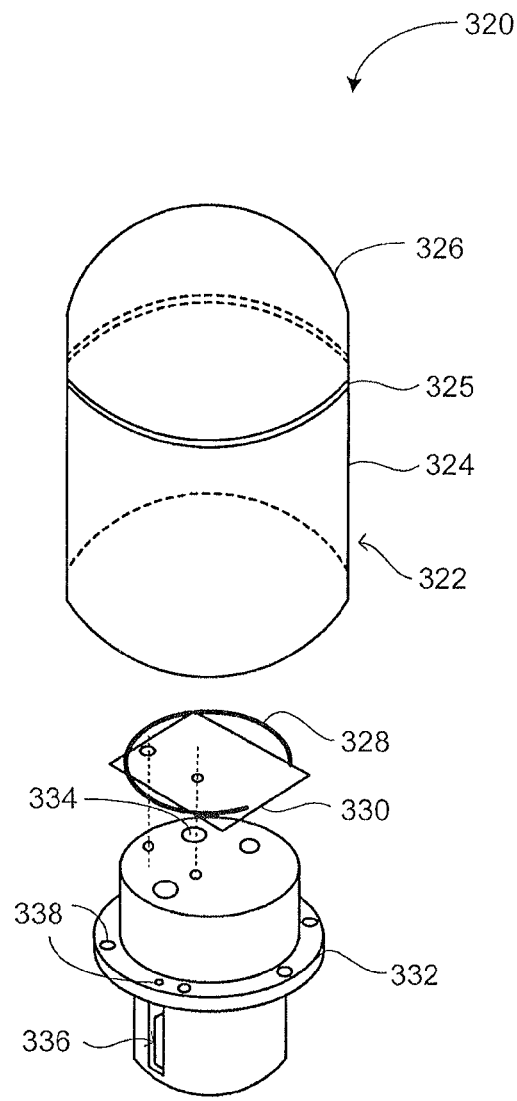
FIG. 4 is an exploded view of a protective fire hydrant casing, constructed and operative in accordance with another embodiment of the disclosed technique.

Reference is now made to FIG. 4 which is an exploded view of a protective fire hydrant casing, generally referenced 320, constructed and operative in accordance with another embodiment of the disclosed technique. FIG. 4 shows a protective FH casing 322, which includes a body 324 and a cap 326. As shown, line 325 may be seen where body 324 and cap 326 are coupled together. Inside cap 326, an antenna 328 and a transceiver 330 are placed. Closing in antenna 328 and transceiver 330 is an inner housing 332. Inner housing 332 includes a first opening 336 which enables a latch (not shown) to engage and disengage from inner housing 332 and a second opening 334, which enables wires from transceiver 330 to be passed into inner housing 332. Inner housing 332 also includes a plurality of screw holes 338 for coupling inner housing 332 with body 324 and with cap 326.

It is noted that protective FH casing 322 or protective FH casing 241 (FIG. 3) may be secured to a fire hydrant (not shown), such as by a chain or a cable. Is this respect, when protective FH casing 322 is removed and the fire hydrant is used, protective FH casing 322 will not get lost or be misplaced inadvertently. Once use of the fire hydrant is over, protective FH casing 322 can then easily be placed back on the fire hydrant and locked into place. The embodiments described above require the protective FH casing of the disclosed technique to be removed in order for access to be gained to the operating nut of the fire hydrant, or the operating nut extender, in order to open the valve of the fire hydrant. According to another embodiment of the disclosed technique, as shown below in FIGS. 5A-5E, the operating nut of the fire hydrant can be opened and closed without removing the protective FH casing. In this embodiment, the protective FH casing operates in a similar manner as described above, except that it additionally allows the operative nut to be accessed when authorized without having to remove the protective FH casing from the fire hydrant.

Figure 5B:
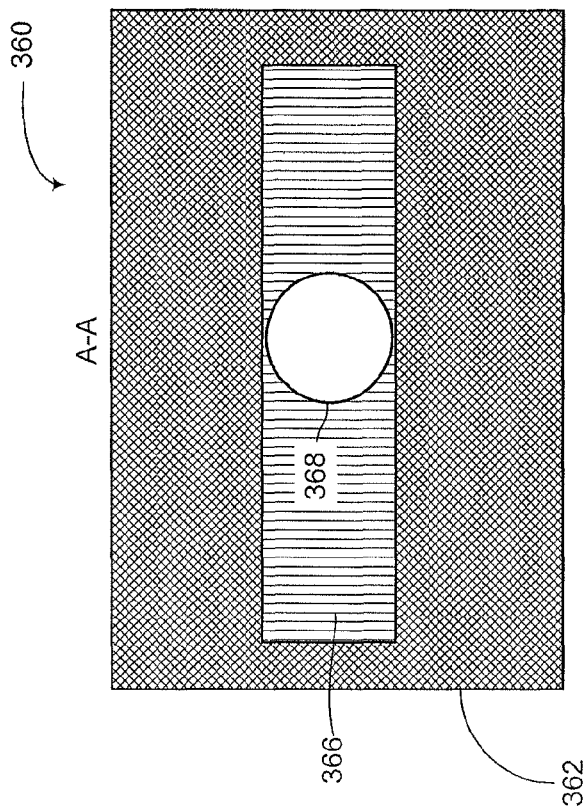
FIGS. 5A and 5B are cross-sectional schematic illustrations of another operating nut extender, constructed and operative in accordance with a further embodiment of the disclosed technique.
Figure 5A:
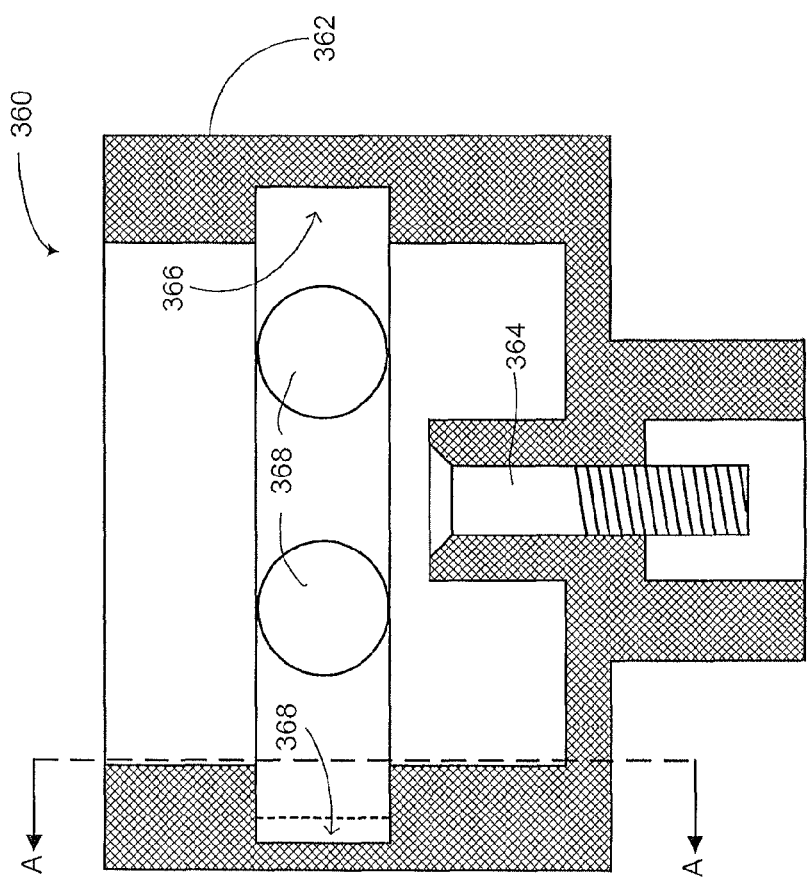

Reference is now made to FIGS. 5A and 5B which are cross-sectional schematic illustrations of another operating nut extender, generally referenced 360, constructed and operative in accordance with a further embodiment of the disclosed technique. Equivalent elements in FIGS. 5A and 5B are labeled using equivalent numbers. Shown in FIG. 5A is a first cross-section of operating nut extender 360. Operating nut extender 360 is substantially similar to operating nut extender 160 (FIG. 2B) and includes an upper cylindrical section 362 and a screw 364, for coupling operating nut extender 360 with the operating nut of a fire hydrant (not shown). Operating nut extender 360 also includes a groove 366 which is circular in shape. In distinction to operating nut extender 160 (FIG. 2B), groove 366 also includes a plurality of holes 368. Plurality of holes 368 substantially extend into groove 366 and are spaced apart around groove 366. Cross-section A-A, showing a portion of operating nut extender 360 is shown in FIG. 5B. FIG. 5B shows operating nut extender 360 having an upper cylindrical portion 362, a groove 366 and a plurality of holes 368. As shown, plurality of holes 368 are located in groove 366 and extend into groove 366.

Figure 5C:
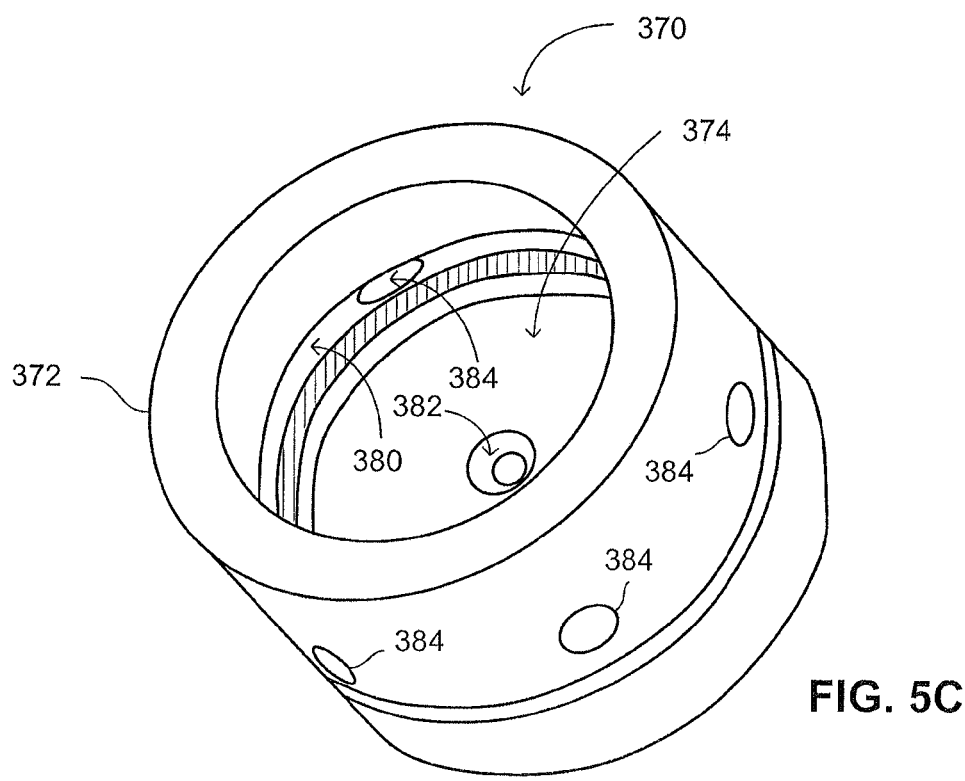
FIGS. 5C and 5D are schematic illustration of perspective views of an operating nut extender constructed and operative in accordance with another embodiment of the disclosed technique.
Figure 5D:
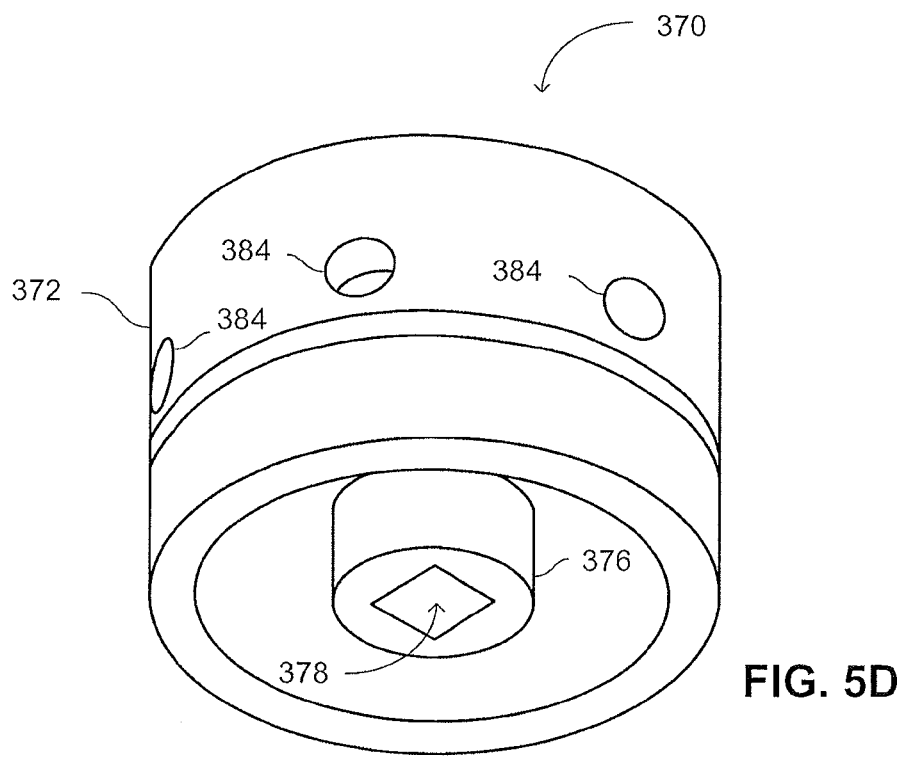

Reference is now made to FIGS. 5C and 5D which are schematic illustration of perspective views of an operating nut extender, generally referenced 380, constructed and operative in accordance with another embodiment of the disclosed technique. Operating nut extender 370 has a generally cylindrical shape, which is hollow and is constructed from a solid piece of metal, such as aluminum, iron, brass, cast steel and the like. Operating nut extender 370 includes a cylindrical section 372, which forms an upper hollow 374, and a lower cylindrical section 376 (FIG. 5D), which forms a lower hollow 378 (FIG. 5D). Cylindrical section 372 has a substantially larger diameter than lower cylindrical section 376. Cylindrical section 372 and lower cylindrical section 376 share a common base section. Cylindrical section 372 includes a groove 380. The common base also includes a hole there through between upper hollow 374 and lower hollow 378. Cylindrical section 372 also includes a plurality of holes 384 in groove 380 extending radially outward. In FIGS. 5C and 5D, holes 384 are depicted as extending through the entire width of cylindrical section 372. However it is noted that holes 384 may extend only through a portion of the width of cylindrical section 372. Furthermore, lower hollow 378 is of a shape matching the operating nut on which operating nut extender is intended to be fitted on. In FIG. 5D, lower hollow 378 exhibits the shape of a square.

Reference is now made to FIGS. 5E to 5G which are schematic illustrations of a protective FH cover, generally referenced 390, showing three states of a latch used with the operating nut extender of FIGS. 5A and 5B, constructed and operative in accordance with a further embodiment of the disclosed technique. Equivalent elements in FIGS. 5C-5E are labeled using equivalent numbers. Certain elements from the protective FH casing of the disclosed technique described have omitted from FIGS. 5C-5E for purposes of clarity but are considered to be a part of the present embodiment. FIGS. 5E-5G include a protective FH casing 392 and an operating nut extender 400. Protective FH casing 392 is substantially similar to protective FH casing 241 (FIG. 3) except for the differences noted below. Protective FH casing 392 includes a body 396, a cap 394 and an inner housing 402. Inner housing 402 includes a first opening 403 and a second opening 404, as well as a lock mechanism 406 and a latch 408. Lock mechanism 406 may be embodied as a magnetic latch solenoid or as an electric motor as further explained below. Operating nut extender 400 includes a groove 412 as well as a screw 418 for coupling operating nut extender 400 to an operating nut (not shown) of a fire hydrant (not shown). Protective FH casing 392 includes a number of differences over protective FH casing 241 (FIG. 3). Protective FH casing 392 includes a nut 398, coupled with cap 394. In general nut 398 exhibits the same shape of the operating nut on which protective FH cover is deployed, in accordance with the local standard, for example, a polygon shape, such as a square, a pentagon or a hexagon. Lock mechanism 406 has three stages such that latch 408 can be placed into three different positions in relation to groove 412. In addition, latch may be circular in shape. Operating nut extender 400 is substantially similar to operating nut extender 360 (FIG. 5A) and includes a plurality of holes 414 inside groove 412. Latch 408 is designed to match the shape and size to each of plurality of holes 414 such that latch 408 can be inserted into each one of holes 414.

FIG. 5E shows latch 408 in a first position 416A in which fire hydrant casing 392 is unlocked. In this position, latch 408 is substantially enclosed within inner housing 402 such that protective FH casing 392 can be removed from operating nut extender 400. First position 416A is substantially similar to the unlocked position of latch 268 (FIG. 3). FIG. 5F shows latch 408 in a second position 416B in which protective FH cover 390 is locked and un-operable. In this position, latch 408 has been advanced through first opening 403 such that one end of latch 408 is positioned within groove 412. In second position 416B, latch 408 is located within groove 412. Second position 416B is substantially similar to the locked position of latch 268 (FIG. 3). In this position, protective FH casing 392 cannot be removed from operating nut extender 400, since latch 408 substantially locks inner housing 402 to operating nut extender 400 internally. It is noted that in this position, protective FH casing 392 can be rotated around as groove 412 is circular in shape. FIG. 5G shows latch 408 in a third position 416C in which protective FH cover 390 is locked and operable. In this position, latch 408 has been further advanced through first opening 403 such that latch 408 is inserted into one of holes 414 within groove 412. In this position, protective FH casing 392 cannot be removed from operating nut extender 400, since latch 408 substantially locks inner housing 402 to operating nut extender 400 internally. Yet in addition, in position 416C, rotating protective FH casing 392 via nut 398 rotates operating nut extender 400 due a torque exerted by latch 408 on operating nut extender 400. In this position, the operating nut of the fire hydrant can be controlled via nut 398 while protective FH casing 392 remains deployed on the fire hydrant.

The embodiment of the disclosed technique shown in FIGS. 5E-5G protects a fire hydrant from tampering while obviating the need for an authorized user to remove the protective FH casing in order to use the fire hydrant. In a locked position, as shown in FIG. 5F, the protective FH casing protects the fire hydrant and prevents use and tampering of the operating nut of the fire hydrant. An authorized user provided with a remote control (not shown), or via a control center, can lock mechanism 406 to place latch 408 in the position shown in FIG. 5G. In this position, an authorized user can use the fire hydrant by rotating nut 398. As a precautionary measure, nut 398 may have an unusual shape (such as a pentagon, heptagon or octagon) requiring a special wrench or tool to turn. In this respect, the protective FH casing of the disclosed technique does not need to be removed by an authorized user for the authorized user to use the fire hydrant. For maintenance purposes, latch 408 can be placed in the position shown in FIG. 5E which enables protective FH casing 392 to be removed from operating nut extender 400. Removal of protective FH casing 392 may be enabled by a special authorization code only available to a maintenance company. In addition, in the embodiments shown in FIGS. 5E-5G, if a battery (not shown) in protective FH casing 392 is completely discharged, such that a remote control (not shown) cannot provide a signal (not shown) to a controller (not shown) inside protective FH casing 392 for operating lock mechanism 406, then the controller can be designed to provide a signal to lock mechanism 406 to place latch 408 in third position 416C when the battery completely discharges. In this respect, the fire hydrant can be used even though latch 408 cannot be controlled electronically. In addition, in the embodiments shown in FIGS. 5G-5E, a micro switch (not shown) in the protective FH casing may indicate if the cap of the protective FH casing was tampered with or not. In these embodiments, the protective FH casing is rarely taken off except for maintenance purposes, and therefore the micro switch is usually depressed. If a signal is sent from a protective FH casing that the micro switch is not depressed and the fire hydrant is not due for a maintenance check-up, then the signal provided may be indicative of vandalism or tampering with the protective FH casing.

In the above embodiment described herein above with reference to FIG. 5A-5E, latch 408 matches each one of holes 414 in operating nut extender 400. Thus, when latch 408 is in the locked and operable position (FIG. 5C), latch 408 locks the FH casing to operating nut extender 400 such that when the FH casing is rotated operating nut extender 400, and thus the operating nut, rotate therewith. However, holes 414 may be replaced with gear teeth around groove 412 and latch 408 includes at least one matching tooth. Thus, when latch 408 is in the locked and operable position the matching tooth or teeth of latch 408 enter the recesses between the gear teeth in groove 412. Alternative, the surface of latch 408 and groove 412 is coated or made of a material exhibiting a high friction coefficient. Thus, when latch 408 is in the locked and operable position latch 408 exerts a force on the surface of groove 412. The friction created between latch 408 and the surface of groove 412 locks the FH casing to operating nut extender 400 such that when the FH casing is rotated operating nut extender 400, and thus said operating nut, rotate therewith.

Figure 6B:
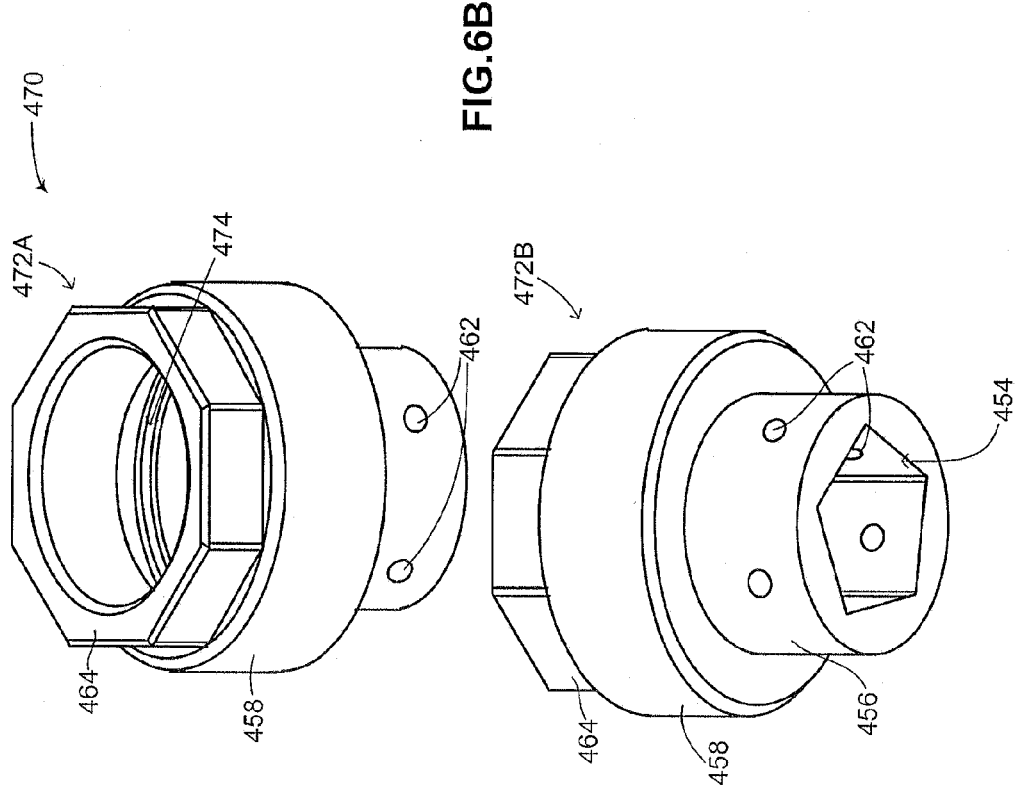
FIGS. 6A and 6B are orthogonal and perspective schematic illustrations, respectively, of a further operating nut extender, constructed and operative in accordance with another embodiment of the disclosed technique.
Figure 6A:
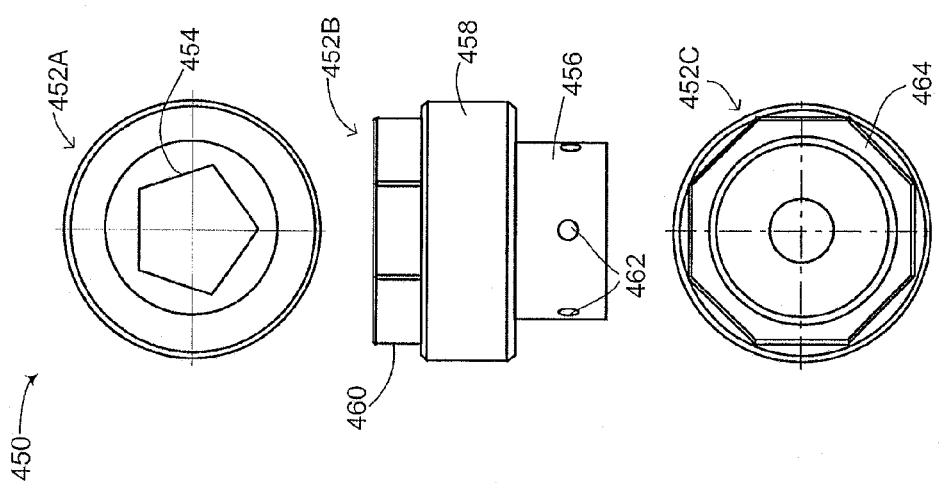

Reference is now made to FIGS. 6A and 6B which are orthogonal and perspective schematic illustrations, respectively, of a further operating nut extender, generally referenced 450 and 470, constructed and operative in accordance with another embodiment of the disclosed technique. FIGS. 6A and 6B show an operating nut extender constructed according to the disclosed technique designed to fit fire hydrants which are designed to have an operating nuts in the shape of a pentagon. Such fire hydrants are common in North America. FIG. 6A shows three orthogonal views of operating nut extender 450, a bottom orthogonal view 452A, a side orthogonal view 452B and a top orthogonal view 452C. Side orthogonal view 452B shows that operating nut extender 450 includes three sections, a lower section 456, a central section 458 and an upper section 460. As shown, lower section 456 is circular in shape on its outer surface. As shown in bottom orthogonal view 452A, the inner surface 454 of lower section 456 is pentagonal in shape. Lower section 456 includes a plurality of screw holes 462 for coupling operating nut extender 450 to an operating nut (not shown) from the side. This is unlike other embodiments of the operating nut extender of the disclosed technique in which the operating nut extender was coupled with the operating nut from the top (see for example FIG. 3). Central section 458 is circular in shape in its inner (not shown in FIG. 6A) and outer surfaces. As shown in top orthogonal view 452C, upper section 460 is an octagon 464. The octagonal shape of upper section 460 is specially designed to match standard size hydrant wrenches used by authorized fire hydrant users, such as firefighters.

FIG. 6B shows two perspective views of operating nut extender 470, a top perspective view 472A and a bottom perspective view 472B. Equivalent elements in FIGS. 6A and 6B are labeled using equivalent numbers. In top perspective view 472A, octagon 464 is visible, as is a groove 474 which is located in central section 458. Also seen is plurality of screw holes 462. In bottom perspective view 472B, octagon 464 as well as central section 458 are visible. As shown, the outer surface (not labeled) of lower section 456 is circular whereas inner surface 454 of lower section 456 is pentagonal in shape. In this embodiment, as shown in bottom perspective view 472B, plurality of screw holes 462 includes five screw holes, one on each side of inner surface 454. Other arrangements of plurality of screw holes 462 are possible and are a matter of design choice.

Figure 7:
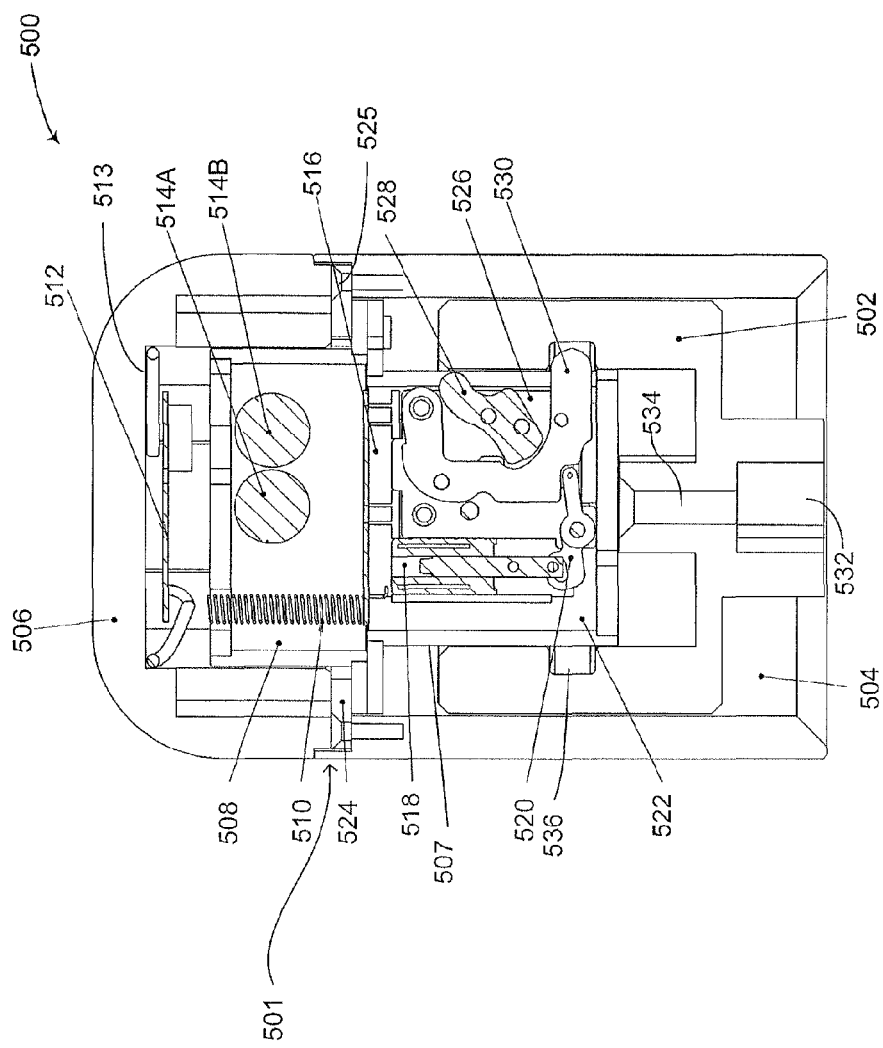
FIG. 7 is another schematic illustration of a protective fire hydrant cover, constructed and operative in accordance with a further embodiment of the disclosed technique.

Reference is now made to FIG. 7, which is another schematic illustration of an exemplary protective fire hydrant cover, generally referenced 500, constructed and operative in accordance with a further embodiment of the disclosed technique. Similar to FIG. 3 above, FIG. 7 shows an operating nut extender of the disclosed technique coupled with an operating nut of a fire hydrant and a protective FH casing deployed on the operating nut extender. Protective FH cover 500 includes a protective FH casing 501 and an operating nut extender 502. Protective FH casing 501 includes a body 504, a cap 506 and an inner housing 507. Protective FH casing 501 is deployed on an operating nut extender 502. As shown, operating nut extender 502 is coupled with operating nut 532 of a fire hydrant (not shown). A screw 534 couples operating nut extender 502 to operating nut 532. Alternatively, a screw, or a plurality of screws, inserted from the side of operating nut extender 502 can be used to couple operating nut extender 502 with operating nut. Operating nut extender 502 includes a groove 536. Groove 536 is substantially circular in shape. Protective FH casing 501, operating nut extender 502 and operating nut 532 are substantially similar to protective FH casing 200 (FIG. 2C), operating nut extender 160 (FIG. 2B) and operating nut 150 (FIG. 2A). Cap 506 is made from a non-conductive material, such as non-metallic composite material, tempered or reinforced plastic, polycarbonates fiberglass and the like, which enables electromagnetic radiation, and thus wireless signals, to pass there through. Cap 506 is attached to body 504 with bolts such as bolt 525 screwed into cap locker holder 524.

Inner housing 507 includes a top shell assembly 508 and a bottom shell assembly 522. Bottom shell assembly 522 includes a first Printed Circuit Board (PCB) 516 and a lock mechanism. The lock mechanism includes a solenoid long plunge 518, a safety catch 520, a side wall 526, a bolt stopper 528 and latch bolt 530. Top shell assembly 508 includes a power source embodied as two batteries 514A and 514B and a first antenna 510. A second PCB 512 is located within protective FH casing 501 under cap 506 and above the outer upper part of inner housing 507. A second antenna 513 is coupled with second PCB 512. First PCB 516 is coupled with first antenna 510 and batteries 514A and 514B and with the lock mechanism. Second PCB 512 is coupled with a second antenna 513, with first PCB 516 and with batteries 514A and 514B.

First PCB 516 may receives signal from a remote control (not shown) similar to remote control 274 (FIG. 3) via first antenna 510. First PCB 516 operates the locking mechanism according to the received signals from the remote control. First PCB 516 may further include a memory which stores data relating to the operation of protective FH cover 500, for example, as monitored by a sensors array—not shown—similar to sensor array 262 of FIG. 3. As described above with reference to FIG. 3, the sensors array, which includes a plurality of sensors for monitoring protective FH cover 500, a fire hydrant (not shown) with protective FH cover 500 deployed thereon well as the area surrounding the fire hydrant. The sensors array may provide signals to first PCB 516, which provides them to first PCB 512. Additionally, First PCB 516 may transmit the data stored therein to the remote. A user (not shown) operating the remote control may download the data, for example to a computer (not shown), for analysis.

Second PCB 512 transmits via second antenna 513 any information stored on the memory to a control center (not shown) similar to control center 276 (FIG. 3). Second PCB 512 may receive signals to lock or unlock the locking mechanism. Second PCB 512 shall provide a respective signal to first PCB 516 to lock or unlock the locking mechanism. Furthermore, second PCB 512 may transmit and receive signals via antenna 513, to and from a control center (not shown) similar to control station 276 (FIG. 3). Further as mentioned above, that body 504, a cap 506 may be embodied as a single element (not shown). Second PCB 512 further transmits information relating to the sensor array to the control center. In addition, second PCB 512 may further transmit periodic signals to the control center. The transmission of periodic signals by second PCB 512 to the control center provides a further indication of whether protective FH cover 500 has been tampered with or not.

Figure 8A:
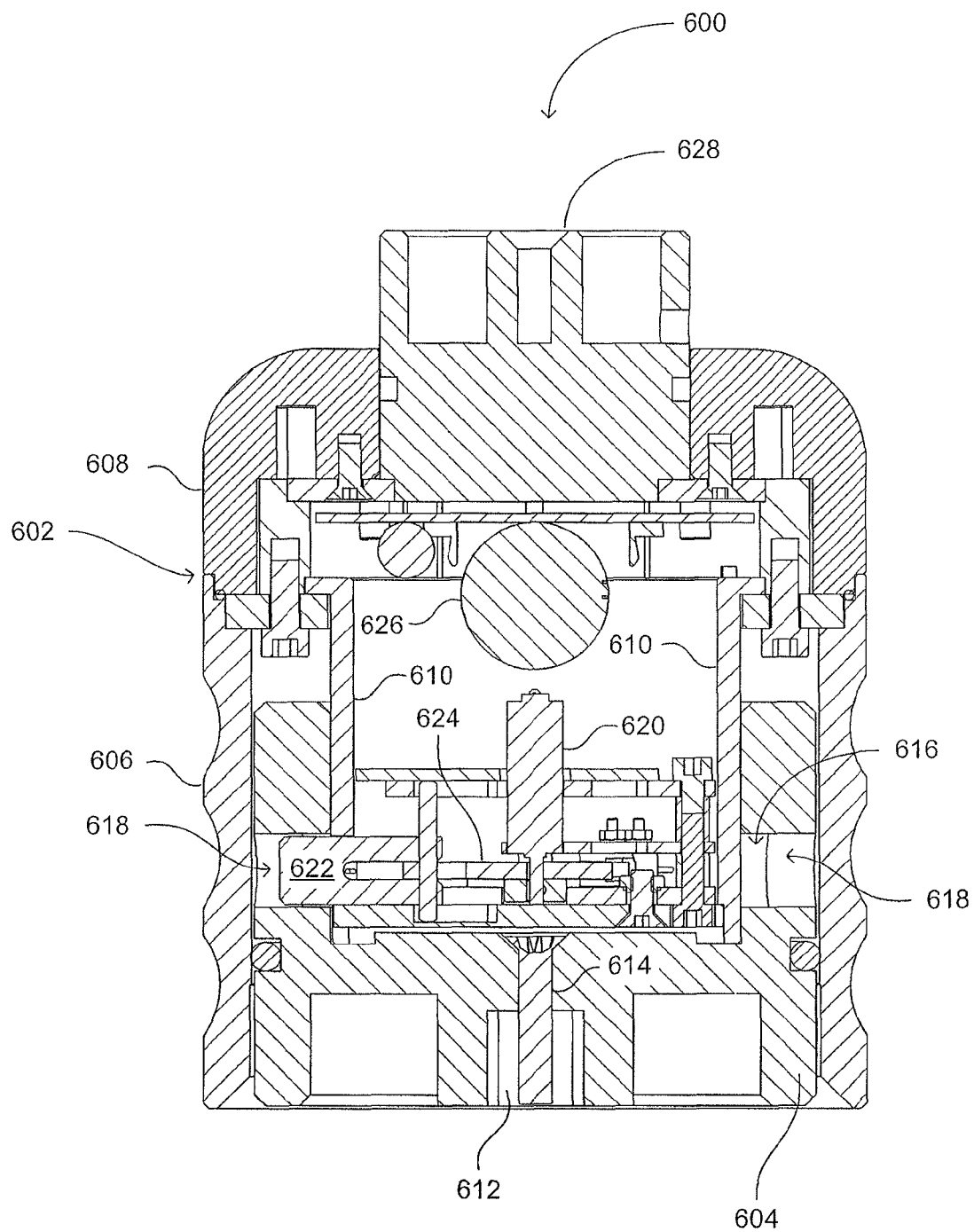
FIG. 8A-8D, which are schematics illustration of a protective fire hydrant cover, constructed and operative in accordance with another embodiment of the disclosed technique.
Figure 8B:
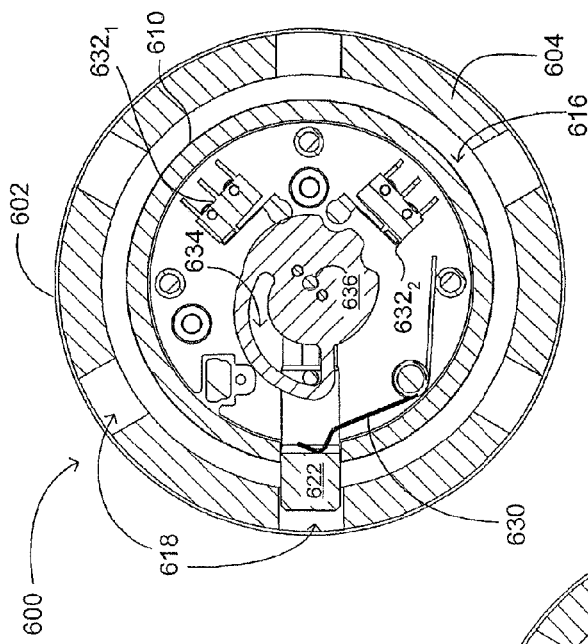
Figure 8C:
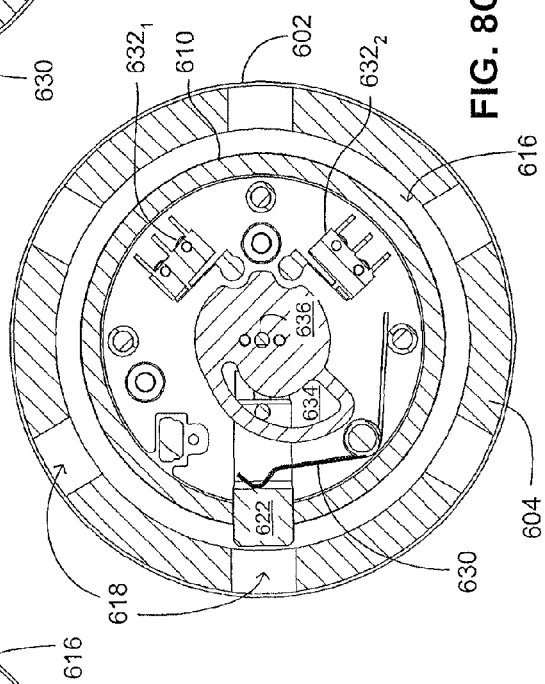
Figure 8D:
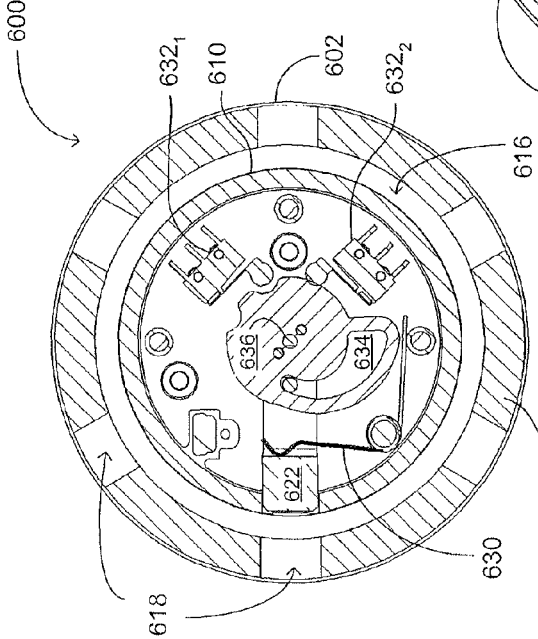

As mentioned above, lock mechanism may be embodied as a motor, which moves a latch between the above mentioned positions for example by employing a crank mechanism. Alternatively, the motor causes the latch to move between the above mentioned positions as further explained below. Reference is now made to FIG. 8A-8D, which are schematics illustration of a protective fire hydrant cover, generally referenced 600, constructed and operative in accordance with another embodiment of the disclosed technique. FIG. 8A is a schematic illustration of a side cross section of protective FH cover 600 and FIGS. 8B to 8D, are schematic illustrations of upper cross section of a protective FH cover 600, showing three states of latch bolt 622. Equivalent elements in FIGS. 8A-8D are labeled using equivalent numbers.

Similar to FIGS. 3, 5E-5G and 7, FIG. 8A shows an operating nut extender of the disclosed technique coupled with an operating nut of a fire hydrant and a protective FH casing deployed on the operating nut extender. Protective FH cover 600 includes a protective FH casing 602 and an operating nut extender 604. Protective FH casing 602 includes a body 606, a cap 608 and an inner housing 610 all coupled together. Protective FH casing 602 is deployed on operating nut extender 604. As shown, operating nut extender 602 is coupled with an operating nut 612 of a fire hydrant (not shown). A screw 614 couples operating nut extender 604 to operating nut 612. Alternatively, a screw, or a plurality of screws, inserted from the side of operating nut extender 604 can be used to couple operating nut extender 604 with operating nut 612. Operating nut extender 604 includes a groove 616. Groove 616 is substantially circular in shape. Groove 616 further includes a plurality of holes 618 therein. Protective FH casing 602, operating nut extender 604 and operating nut 612 are substantially similar to protective FH casing 390 (FIGS. 5E-5G), operating nut extender 400 (FIGS. 5E-5G) and operating nut 150 (FIG. 2A). Protective FH casing 602 also includes a nut 628, coupled with protective FH casing 602. Nut 628 exhibits the same shape of operating nut 612, in accordance with the local standard of the shape of operating nut 612 (e.g., a square, a pentagon or a hexagon).

Inner housing 610 includes therein a lock mechanism. The lock mechanism includes a motor 620, latch bolt 622, a latch bolt lead 624 and a spring 630 (FIGS. 8B-8D). Latch bolt lead 624 is coupled with motor 618 and movably coupled with latch bolt 622. Spring 630 is coupled with inner housing 610 and with latch bolt 622 as further explained below. Inner housing 610 further includes a power source embodied as a battery 316. A transceiver (not shown) also located within inner housing 610 may receiver a signal from a remote control (not shown) similar to remote control 274 (FIG. 3) via an antenna (not shown). A controller (not shown) operates motor 620 according to the received signals from the remote control. Motor 620 is adapted to rotate latch bolt lead 324 between three positions, which in turn moves latch bolt 622 between three different positions as further explained below with reference to FIGS. 8B-8D. As mentioned above in conjunction with FIG. 5E-5G, these three different positions are the unlocked position, the locked and un-operable position and the locked and operable position. In FIG. 8A, latch bolt 622 and thus protective FH cover 600 is in the locked and operable position where latch bolt 622 is inserted into one of holes 618. In this position, protective FH casing 602 cannot be removed from operating nut extender 604, since latch 622 internally locks protective FH casing 602 to operating nut extender 400. Yet in addition, in position this position, rotating protective FH casing 602 via nut 628 rotates operating nut extender 604 due a torque exerted by latch 622. In this position, the operating nut 612 of the fire hydrant can be controlled via nut 628 while protective FH cover 600 remains deployed on the fire hydrant (e.g., using the same designated tool used to operate operating nut 612 when both nut 628 and operating nut 612 exhibit the same shape). Protective FH cover 600 may further include a sensor array, similar to sensor array 262 (FIG. 3) for monitoring selected characteristics of protective FH cover 600 and the surroundings thereof.

With reference to FIGS. 8B-8D and as mentioned above the lock mechanism includes a motor 620 (not shown in FIGS. 8B-8D for clarity purposes), latch bolt 622, a latch bolt lead 624 and a spring 630 (FIGS. 8B-8D). Latch bolt lead 624 is coupled with motor 618 and movably coupled with latch bolt 622. Spring 630 is coupled with inner housing 610 and with latch bolt 622. Spring 630 continuously exerts a force on latch bolt 622 in an outward radial direction from axis 636. The edge of a recess 634 in latch bolt lead 624 prevents latch bolt 622 from moving in the in an outward radial direction regardless of the force exerted by spring 630. However, distance of the edge of recess 634 is different at each rotation state of latch bolt lead 624. Thus, when motor 618 (FIG. 8A) turns latch bolt lead 624 in one direction, spring 630 pushes latch bolt 622 away from axis 636 until the edge of recess 634 stops latch bolt 622. When motor 618 turns latch bolt lead 624 in the other direction, the edge of recess 636 pushes latch bolt 622 toward axis 636. Switches 632$_1$ and 632$_2$ indicated to the controller the current position of the lock mechanism.

FIG. 8B depict the lock mechanism in the unlocked position in which latch bolt 622 is located within inner housing 610. In this position protective FH casing may be removed from operating nut extender 604 (FIG. 8A), for example, for maintenance purposes. In FIG. 8C, motor 618 has turned to place lock mechanism in the locked and un-operable position. In this position, the edge of recess 634 moved away from axis 636. Since as mentioned above, spring 630 exerts a force in the on latch bolt 622 in an outward radial direction from axis 636, latch 622 moved away from axis 636 and entered inner groove 616. In this position, protective FH casing 602 is free to rotate about operating nut extender 604 but without rotating operating nut extender 604. In FIG. 8D, motor 618 has turned further, to place lock mechanism in the locked and operable position. In this position the edge of recess 634 moved further away from axis 636 and latch 622 moved into one of holes 818. In this position, when protective FH casing 602 is rotated, latch bolt 622 exerts a torque on operating nut extender 604. Thus, when protective FH casing is rotated, operating nut extender 604 and thus operating nut 612 rotate therewith. Thus, the fire hydrant my be operated without removing protective FH casing 602 It will be appreciated by persons skilled in the art that the disclosed technique is not limited to what has been particularly shown and described hereinabove. Rather the scope of the disclosed technique is defined only by the claims, which follow.

The invention claimed is:

1. A protective fire hydrant cover comprising:
   an operating nut extender, adapted to be firmly coupled with an operating nut of a fire hydrant such that when said operating nut extender is rotated, said operating nut rotates therewith, said operating nut extender including an inner groove exhibiting a substantially circular shape; and
   a protective fire hydrant casing including a lock mechanism therein, said lock mechanism including a latch, said latch being adapted to move between at least a locked and un-operable position and an unlocked position, said protective fire hydrant casing being adapted to be fitted over said operating nut extender such that said protective fire hydrant casing covers said operating nut extender and said latch is aligned with said groove,
   a transceiver adapted to transmit and receive signals via an antenna; and
   a controller, coupled with said transceiver and with said lock mechanism, said controller indicating to said lock mechanism to move said latch at least between said locked and un-operable position and said unlocked position according to signals indicative thereof received by said transceiver,
   wherein when said latch moves to said locked and un-operable position said latch enters said inner groove thus internally locking said protective fire hydrant casing with said operating nut extender and thus locking said protective fire hydrant cover onto said fire hydrant,
   wherein when said latch is in said locked and un-operable position said protective fire hydrant casing is free to rotate about said operating nut extender without rotating said operating nut extender, and
   wherein when said latch moves to said unlocked position, said protective fire hydrant casing is unlocked from said operating nut extender.

2. The protective fire hydrant cover according to claim 1, wherein said latch further adapted to move to a locked and operable position, in said locked and operable position said latch is inserted into said at least one hole, thus said latch locks said protective fire hydrant casing to said operating nut extender, such that when said protective fire hydrant casing is rotated, said operating nut extender and thus said operating nut rotate therewith.

3. The protecting fire hydrant cover according to claim 2 wherein said controller indicating to said lock mechanism to move said latch to said locked and operable position according to signals indicative thereof received by said transceiver.

4. The protective fire hydrant cover according to claim 1, wherein said transceiver receives said signals from a remote control adapted to transmit signal to said transceiver indicating to move said latch to a selected one of said at least locked and un-operable position and said unlocked position.

5. The protective fire hydrant cover according to claim 1, further including an array of sensor coupled with said controller, said array of sensors monitoring selected characteristics of said fire hydrant and providing said controller with information relating to said selected characteristics.

6. The protective fire hydrant cover according to claim 5, wherein said array of sensors include sensors selected from the group consisting of:
   a temperature sensor;
   a smoke sensor;
   a vibration sensor;
   a sound sensor;
   a flow sensor;
   a pressure sensor;
   an optical sensor
   a backflow sensor; and
   a micro switch.

7. The protective fire hydrant cover according to claim 6, wherein said micro switch is adapted to indicate when said protective fire hydrant casing is physically placed on said operating nut extender and when said protective fire hydrant casing is not physically placed on said operating nut extender
   wherein when said micro switch indicates that said protective fire hydrant casing is not placed on said operating nut extender, said controller indicates to said lock mechanism move said latch to said unlocked position.

8. The protective fire hydrant cover according to claim 5, wherein said transceiver is further adapted to communicate with a control center, said control center is adapted to transmit signal to said transceiver indicating to move said latch to a selected one of said at least locked and un-operable position and said unlocked position.

9. The protective fire hydrant cover according to claim 8, wherein said control center is further adapted for user authorization management.

10. The protective fire hydrant cover according to claim 8, wherein said controller transmits to said control center via said transmitter information received from said array of sensors.

11. The protective fire hydrant cover according to claim 5 further including a memory coupled with at least one of said controller said array of sensors and said transceiver for recording and storing information.

12. The protective fire hydrant cover according to claim 5 further including a power source, coupled with said transceiver, with said controller and with array of sensors adapted to power thereto.

13. The protective fire hydrant cover according to claim 5, further including an additional sensor array located remotely from said fire hydrant, said additional sensor array is wirelessly coupled with said controller via said transceiver for sensing selected parameters at the surroundings of said fire hydrant, and
   wherein, said transceiver operates as a transmission relay between said additional sensors array and said control.

14. The protective fire hydrant cover according to claim 5, wherein said transceiver is adapted to be employed as a transmission relay between said control center other sensors located in the vicinity of said fire hydrant.

15. The protective fire hydrant cover according to claim 5, wherein said other sensors are one of a water meter and a power meter.

16. The protective fire hydrant cover according to claim 1, wherein said lock mechanism is a magnetic latch solenoid including a solenoid long plunge, a safety catch, a side wall, a bolt stopper and a latch bolt.

17. The protective fire hydrant cover according to claim 1, wherein said lock mechanism includes is an electric motor a latch lead, a spring and said latch, said latch lead includes a recess, wherein said spring is coupled with said inner housing and with said latch and continuously exerts a force on said latch outward radial direction, wherein the edge of said recess prevents said latch from moving in the in an outward radial direction regardless of the force exerted by said spring, wherein a distance of said edge of said recess is different at each rotation state of said latch lead, thus, when said motor turns said latch lead in one direction, said spring pushes said latch away in said outward radial direction until said edge of said recess stops said latch, and wherein when said motor turns said latch lead in the other direction, the edge of said recess pushes said latch inward.

18. The protective fire hydrant cover according to claim 1 further including an inner housing coupled within said protective fire hydrant casing, said inner housing including at least a first opening, and wherein said lock mechanism, and said controller are located within said inner housing and said latch is adapted to move in and out of said inner housing through said first opening between at least said locked and un-operable position and said unlocked position.

19. The protective fire hydrant cover according to claim 18, wherein said protective fire hydrant casing includes a body and a cap, said body and said cap and said inner housing are all coupled together wherein said inner housing further includes a second opening, wherein said Inner housing is hollow and forms a first chamber, wherein a hollow is formed between an inner surface of said cap and an outer surface of said inner housing thereby forming a second chamber, wherein said transceiver and said antenna are located in said second chamber and said controller and said lock mechanism are located in said first chamber said transceiver being coupled with said controller via said second opening.

20. The protective fire hydrant cover according to claim 16, wherein at least said cap is made of non-metallic material.

21. The protective fire hydrant cover according to claim 1, wherein said protective fire hydrant casing is made of a single element.

* * * * *